US009603374B2

(12) United States Patent
Merrill et al.

(10) Patent No.: US 9,603,374 B2
(45) Date of Patent: *Mar. 28, 2017

(54) CHEESE AND METHODS OF MAKING SUCH CHEESE

(71) Applicant: Leprino Foods Company, Denver, CO (US)

(72) Inventors: Richard K. Merrill, Highlands Ranch, CO (US); Mayank Singh, Aurora, CO (US)

(73) Assignee: Leprino Foods Company, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,003

(22) Filed: Apr. 11, 2013

(65) Prior Publication Data

US 2014/0134294 A1    May 15, 2014

Related U.S. Application Data

(60) Division of application No. 13/584,392, filed on Aug. 13, 2012, now abandoned, which is a continuation of application No. 12/772,628, filed on May 3, 2010, now Pat. No. 8,241,691, which is a continuation of application No. 11/244,441, filed on Oct. 4, 2005, now Pat. No. 7,713,564, which is a continuation of application No. 11/121,537, filed on May 3, 2005, now Pat. No. 7,585,537.

(60) Provisional application No. 60/568,029, filed on May 3, 2004.

(51) Int. Cl.
| A23C 19/00 | (2006.01) |
| A23C 19/068 | (2006.01) |
| A23C 19/084 | (2006.01) |
| A23C 19/093 | (2006.01) |
| A23C 19/02 | (2006.01) |

(52) U.S. Cl.
CPC ........ *A23C 19/0684* (2013.01); *A23C 19/084* (2013.01); *A23C 19/093* (2013.01); *A23C 19/00* (2013.01); *A23C 19/02* (2013.01)

(58) Field of Classification Search
CPC . A23C 19/084; A23C 19/093; A23C 19/0684; A23C 19/02; A23C 19/00
USPC ......... 426/34, 36, 61, 71, 72, 580, 582, 519, 426/520, 521, 522
See application file for complete search history.

(56) References Cited

U.S. PATENT DOCUMENTS

| 1,748,781 A | 2/1930 | Martin |
| 2,688,553 A | 9/1954 | Schicks et al. |
| 2,956,885 A | 10/1960 | Roundy et al. |
| 3,741,774 A | 6/1973 | Burkwall, Jr. |
| 3,961,077 A | 6/1976 | Kielsmeier |
| 3,998,700 A | 12/1976 | Reinbold et al. |
| 4,016,298 A | 4/1977 | Kasik et al. |
| 4,085,228 A | 4/1978 | Reinbold et al. |
| 4,137,397 A | 1/1979 | Dutta et al. |
| 4,244,983 A | 1/1981 | Baker |
| 4,268,528 A | 5/1981 | Montigny |
| 4,339,468 A | 7/1982 | Kielsmeier |
| 4,343,817 A | 8/1982 | Swanson et al. |
| 4,372,979 A | 2/1983 | Reinbold et al. |
| 4,397,878 A | 8/1983 | Koide et al. |
| 4,459,313 A | 7/1984 | Swanson et al. |
| 4,460,609 A | 7/1984 | Kristiansen et al. |
| 4,552,774 A | 11/1985 | Gronfor |
| 4,568,555 A | 2/1986 | Spanier |
| 4,592,274 A | 6/1986 | Tomatis |
| 4,608,921 A | 9/1986 | Mongiello, Sr. |
| 4,626,439 A | 12/1986 | Meyer |
| 4,665,811 A | 5/1987 | Meyer |
| 4,753,815 A | 6/1988 | Kielsmeier et al. |
| 4,766,076 A | 8/1988 | Sandine et al. |
| 4,894,245 A | 1/1990 | Kielsmeier et al. |
| 4,898,745 A | 2/1990 | Zamzow et al. |
| 4,919,943 A | 4/1990 | Yee et al. |
| 4,937,091 A | 6/1990 | Zallie et al. |

(Continued)

FOREIGN PATENT DOCUMENTS

| EP | 0 535 728 A2 | 4/1993 |
| EP | 1 123 658 A2 | 8/2001 |

(Continued)

OTHER PUBLICATIONS

Breene, W.M., et al., "Manufacture of Pizza Cheese Without Starter", 1964, Journal of Dairy Science, 47:1173-1180.
Dulley, J.R. "The utilisation of cheese slurries to accelerate the ripening of cheddar cheese." Australian Journal of Dairy Technology, 1976, 31; 4: 4 pgs.
Further Examination Report for EP 05 747 013 dated Feb. 9, 2012, 5 pages.
International Search Report and Written Opinion of PCT/US05/15270 mailed on Sep. 20, 2006, 6 pages.
Kilcawley, K.N., et al. "Enzyme-Modified Cheese." International Dairy Journal, 1998, 8: 2 pgs.

(Continued)

*Primary Examiner* — Leslie Wong
(74) *Attorney, Agent, or Firm* — Kilpatrick Townsend & Stockton LLP

(57) ABSTRACT

Soft or firm/semi-hard ripened or unripened cheese products that has a native or modified starch and one or more additional ingredients are described. The additional ingredients may be chosen from a non-fat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a thickener, an oil, a fat, a cheese powder, a salt, a nutritional supplement, an acid, an enzyme, a neutraceutical, a carbohydrate, a vitamin, and a mineral. The starch, and additional ingredients may have a combined concentration of greater than 10%, by weight of the cheese product.

29 Claims, 12 Drawing Sheets

(56) References Cited

U.S. PATENT DOCUMENTS

| | | |
|---|---|---|
| 4,957,749 A | 9/1990 | Prieels et al. |
| 4,959,229 A | 9/1990 | Reddy et al. |
| RE33,508 E | 12/1990 | Kielsmeier et al. |
| 4,997,670 A | 3/1991 | Kielsmeier et al. |
| 5,030,470 A | 7/1991 | Kielsmeier et al. |
| 5,080,913 A | 1/1992 | Gamay |
| 5,094,873 A | 3/1992 | Kerrigan et al. |
| 5,104,675 A | 4/1992 | Callahan et al. |
| 5,108,773 A | 4/1992 | Smith et al. |
| 5,200,216 A | 4/1993 | Barz et al. |
| 5,215,778 A | 6/1993 | Davison et al. |
| 5,225,220 A | 7/1993 | Gamay |
| 5,234,700 A | 8/1993 | Barz et al. |
| 5,234,707 A | 8/1993 | Merkenich et al. |
| 5,240,724 A | 8/1993 | Otto et al. |
| 5,244,687 A | 9/1993 | Rybinski et al. |
| 5,277,926 A | 1/1994 | Batz et al. |
| 5,320,860 A | 6/1994 | Duval et al. |
| 5,330,780 A | 7/1994 | Yee et al. |
| 5,336,765 A | 8/1994 | Au et al. |
| 5,350,595 A | 9/1994 | Hockenberry et al. |
| 5,374,443 A | 12/1994 | Jackson et al. |
| 5,380,543 A | 1/1995 | Barz et al. |
| 5,395,630 A | 3/1995 | Gamay |
| 5,413,804 A | 5/1995 | Rhodes |
| 5,431,931 A | 7/1995 | Nauth et al. |
| 5,431,946 A | 7/1995 | Vesely et al. |
| 5,462,755 A | 10/1995 | Mehnert |
| 5,466,477 A | 11/1995 | Sevenich |
| 5,470,595 A | 11/1995 | Kopp et al. |
| 5,480,666 A | 1/1996 | Lindgren |
| 5,484,618 A | 1/1996 | Barz et al. |
| 5,520,934 A | 5/1996 | Meilleur |
| 5,529,795 A | 6/1996 | Aldrovandi |
| 5,532,018 A | 7/1996 | Miller et al. |
| 5,549,916 A | 8/1996 | Gamay |
| 5,567,464 A | 10/1996 | Barz et al. |
| 5,612,073 A | 3/1997 | Gamay |
| 5,709,900 A | 1/1998 | Miller et al. |
| 5,750,177 A | 5/1998 | Yee et al. |
| 5,766,657 A | 6/1998 | Farkye et al. |
| 5,773,054 A | 6/1998 | Meibach et al. |
| 5,895,671 A | 4/1999 | Adamany et al. |
| 5,902,625 A | 5/1999 | Barz et al. |
| 5,906,854 A | 5/1999 | Scherping et al. |
| 5,925,398 A | 7/1999 | Rizvi et al. |
| 5,942,263 A | 8/1999 | Chen et al. |
| 5,952,030 A | 9/1999 | Nelles et al. |
| 5,967,026 A | 10/1999 | Nelles et al. |
| 6,007,852 A | 12/1999 | Reinbold et al. |
| 6,079,323 A | 6/2000 | Dzenis |
| 6,086,926 A | 7/2000 | Bruce et al. |
| 6,120,809 A | 9/2000 | Rhodes |
| 6,143,334 A | 11/2000 | Reinbold et al. |
| RE37,264 E | 7/2001 | Chen et al. |
| 6,303,160 B1 | 10/2001 | Laye et al. |
| 6,319,526 B1 | 11/2001 | Dahlstrom et al. |
| 6,322,841 B1 | 11/2001 | Jackson et al. |
| 6,326,038 B1 | 12/2001 | Brafford et al. |
| 6,358,543 B1 | 3/2002 | Soe et al. |
| 6,358,551 B1 | 3/2002 | Sadowsky, IV et al. |
| 6,372,268 B1 | 4/2002 | Silver et al. |
| 6,426,102 B1 | 7/2002 | Isom et al. |
| 6,440,481 B1 | 8/2002 | Gascoigne et al. |
| 6,455,081 B1 | 9/2002 | Han et al. |
| 6,475,538 B2 | 11/2002 | Thakar et al. |
| 6,475,638 B1 | 11/2002 | Mitsuhashi et al. |
| 6,506,426 B2 | 1/2003 | Adamany et al. |
| 6,536,691 B2 | 3/2003 | Prewitt et al. |
| 6,558,716 B1 | 5/2003 | Kent et al. |
| 6,562,383 B1 | 5/2003 | Moran et al. |
| 6,645,542 B2 | 11/2003 | Nelles et al. |
| 6,669,978 B2 | 12/2003 | Laye et al. |
| 6,773,740 B2 | 8/2004 | Hyde et al. |
| 6,780,445 B1 | 8/2004 | Rhodes |
| 6,872,412 B2 | 3/2005 | Soe et al. |
| 6,905,721 B2 | 6/2005 | Jacobson et al. |
| 6,916,496 B2 * | 7/2005 | Koka .............. A23C 9/1213 426/36 |
| 6,998,145 B2 | 2/2006 | Henry et al. |
| 7,169,429 B2 | 1/2007 | Merrill et al. |
| 7,579,033 B2 | 8/2009 | Merrill et al. |
| 7,585,537 B2 | 9/2009 | Merrill et al. |
| 7,651,715 B2 | 1/2010 | Merrill et al. |
| 7,666,458 B2 | 2/2010 | Merrill et al. |
| 7,695,745 B2 | 4/2010 | Johnston et al. |
| 7,713,564 B2 | 5/2010 | Merrill et al. |
| 7,842,325 B2 | 11/2010 | Fitzsimons et al. |
| 7,976,886 B2 | 7/2011 | Merrill et al. |
| 8,241,691 B2 | 8/2012 | Merrill et al. |
| 8,642,106 B2 * | 2/2014 | Merrill et al. ............. 426/582 |
| 2003/0104106 A1 | 6/2003 | Trecker et al. |
| 2004/0018292 A1 | 1/2004 | Lindstrom et al. |
| 2004/0076729 A1 | 4/2004 | Jaskulka |
| 2005/0196509 A1 | 9/2005 | Murphy |
| 2005/0249853 A1 | 11/2005 | Merrill et al. |
| 2005/0249854 A1 | 11/2005 | Merrill et al. |
| 2005/0271789 A1 | 12/2005 | Merrill et al. |
| 2006/0083820 A1 | 4/2006 | Merrill et al. |
| 2006/0083821 A1 | 4/2006 | Merrill et al. |
| 2006/0083822 A1 | 4/2006 | Merrill et al. |
| 2010/0062110 A1 | 3/2010 | Elston et al. |
| 2010/0112137 A1 | 5/2010 | Merrill et al. |
| 2010/0239713 A1 | 9/2010 | Merrill et al. |
| 2011/0097441 A1 | 4/2011 | Merrill et al. |
| 2011/0229622 A1 | 9/2011 | Merrill et al. |
| 2012/0328737 A1 | 12/2012 | Merrill et al. |
| 2014/0178530 A1 | 6/2014 | Merrill et al. |

FOREIGN PATENT DOCUMENTS

| | | |
|---|---|---|
| JP | H09-172964 A | 7/1997 |
| JP | H09-172965 A | 7/1997 |
| JP | 11-332462 | 12/1999 |
| NZ | 199366 A | 5/1986 |
| WO | 02-89592 A1 | 11/2002 |
| WO | 03/037093 A1 | 5/2003 |
| WO | 03/069982 A1 | 8/2003 |
| WO | 2004/057971 A1 | 7/2004 |
| WO | 2005-104859 A2 | 11/2005 |
| WO | 2005/107486 A2 | 11/2005 |

OTHER PUBLICATIONS

Kosikowski, F.V. and Mistry, V.V. "Cheese and fermented milk foods." 3rd ed., Westport, Conn., 1997, 8 pgs.

Kristoffersen, T., et al. "Cheddar Cheese Flavor. IV. Directed and Accelerated Ripening Process." Journal of Dairy Science, 1966, 50; 3: 6 pgs.

Larson, W., et al., "Continuous Direct Acidification System for Producing Mozzarella Cheese," Presented at the 64th Annual Meeting of the American Dairy Science Association, Jun. 28-Jul. 1, 1970, 8 pages.

Law, B.A. "Technology of Cheesemaking." 1st ed, Sheffield Academic Press, 1999, 32 pgs.

Miyamoto, Y., et al., "Production of lactobionic acid from whey by *Pseudomonas* sp. L513-1," Biotechnology Letters, 2000, vol. 22, No. 5, pp. 427-430.

Murakami, H., et al., "Fermentative Production of Lactobionic Acid by Burkholderia cepacia," Journal of Applied Glycoscience, 2003, vol. 50, No. 2, pp. 117-120.

New Zealand Patent Office, Patent Application No. 199366 for New Zealand Dairy Board, filed Mar. 20, 1982, 16 pages.

Rand, Jr., A., et al., "Direct Enzymatic Conversion of Lactose in Milk to Acid," Journal of Dairy Science, 1975, vol. 58, No. 8, pp. 1144-1150.

Scott, R., Cheesemaking Practice, Second Edition, "Chapter 13—Cheesemaking Operations," Elsevier Applied Science Publishers, London/New York, 1986, pp. 186-212.

(56) References Cited

OTHER PUBLICATIONS

Shehata, A., et al., "Effect of Type of Acid Used in Direct Acidification Procedures on Moisture, Firmness, and Calcium Levels of Cheese," Journal of Dairy Science, 1967, vol. 50, No. 6, pp. 824-827.
Singh, S. and Kristoffersen T. "Factors Affecting Flavour Development in Cheddar Cheese Slurries." Journal of Dairy Science, 1969, 53; 5: 3 pgs.
Supplemental European Search Report for EP 05 747 013 dated Jul. 31, 2009, 5 pages.
Sutherland, B.J. "Rapidly ripened cheese curd slurries in processed cheese manufacture." Australian Journal of Dairy Technology, 1975, 30; 4: 4 pgs.
Talbott, L., et al.. "The use of enzyme modified cheeses for flavouring processed cheese products." Proceedings from the Second Biennial Marschall International Cheese Conference, Madison, Wisconsin, USA, Sep. 15-19, 1981, 26 pages.
Document 1, Kraft Opposition of Australian Patent # 2005240120 filed Oct. 22, 2010, 14 pages.
Document 2, Kraft Opposition of Australian Patent # 2005240120 filed Oct. 19, 2011, 62 pages.
Document 3, Kraft Opposition of Australian Patent # 2005240120 filed Sep. 12, 2013, 62 pages.
Document 4, Kraft Opposition of Australian Patent # 2005240120 filed Feb. 25, 2013, 12 pages.
Document 5, Kraft Opposition of Australian Patent # 2005240120 filed Feb. 14, 2014, 17 pages.
Document 6, Kraft Opposition of Australian Patent # 2005240120 filed May 30, 2013, 12 pages.
Document 1, Fonterra Opposition of Australian Patent # 2005240120 filed Oct. 22, 2010, 20 pages.
Document 2, Fonterra Opposition of Australian Patent # 2005240120 filed Sep. 1, 2013, 13 pages.
Document 3, Fonterra Opposition of Australian Patent # 2005240120 filed Sep. 1, 2011, 69 pages.
Document 4, Fonterra Opposition of Australian Patent # 2005240120 filed Aug. 31, 2011, 2 pages.
Document 5, Fonterra Opposition of Australian Patent # 2005240120 filed Dec. 9, 2011, 6 pages.
Document 6, Fonterra Opposition of Australian Patent # 2005240120 filed Aug. 31, 2011, 4 pages.
Document 7, Fonterra Opposition of Australian Patent # 2005240120 filed Feb. 25, 2013, 14 pages.
Document 8, Fonterra Opposition of Australian Patent # 2005240120 filed May 30, 2013, 12 pages.
Document 9, Fonterra Opposition of Australian Patent # 2005240120 filed Aug. 6, 2013, 26 pages.
Document 10, Fonterra Opposition of Australian Patent # 2005240120 filed Feb. 14, 2014, 16 pages.
Document 1, Kraft Opposition of Australian Patent# 2010212424 filed Aug. 26, 2011, 1 page.
Document 2, Kraft Opposition of Australian Patent# 2010212424 filed Jun. 14, 2012, 72 pages.
Document 3, Kraft Opposition of Australian Patent# 2010212424 filed Apr. 22, 2014, 235 pages.
Document 4, Kraft Opposition of Australian Patent# 2010212424 filed Apr. 16, 2014, 12 pages.
Document 5, Kraft Opposition of Australian Patent# 2010212424 filed Dec. 19, 2012, 9 pages.
Document 1, Fonterra Opposition of Australian Patent # 2010212424 filed Aug. 26, 2011, 1 page.
Document 2, Fonterra Opposition of Australian Patent # 2010212424 filed Dec. 10, 2013, 16 pages.
Document 3, Fonterra Opposition of Australian Patent # 2010212424 filed Dec. 6, 2013, 2 pages.
Document 4, Fonterra Opposition of Australian Patent # 2010212424 14 pages.
Document 5, Fonterra Opposition of Australian Patent # 2010212424 filed May 30, 2013, 12 pages.
Document 6, Fonterra Opposition of Australian Patent # 2010212424 filed Dec. 19, 2012, 9 pages.
Document 7, Fonterra Opposition of Australian Patent # 2010212424 filed Apr. 24, 2014, 180 pages.
Document 8: Fonterra Opposition of Australian Patent # 2010212424 filed Apr. 24, 2014, 162 pages.
Document 9, Fonterra Opposition of Australian Patent # 2010212424 filed Apr. 24, 2014, 115 pages.
Document 1, Kraft Opposition of New Zealand Patent# 550846 filed Aug. 11, 2011, 17 pages.
Document 2, Kraft Opposition of New Zealand Patent# 550846 filed Oct. 10, 2011, 4 pages.
Document 3, Kraft Opposition of New Zealand Patent# 550846 filed Jun. 14, 2012, 53 pages.
Document 4, Kraft Opposition of New Zealand Patent# 550846 filed Jun. 14, 2012, 51 pages.
Document 5, Kraft Opposition of New Zealand Patent# 550846 filed Jun. 24, 2014, 41 pages.
Document 6, Kraft Opposition of New Zealand Patent# 550846 filed Dec. 17, 2014, 104 pages.
Document 1, Fonterra Opposition of New Zealand Patent # 550846 filed Jul. 29, 2011, 15 pages.
Document 2, Fonterra Opposition of New Zealand Patent # 550846 filed Sep. 2011, 5 pages.
Document 3, Fonterra Opposition of New Zealand Patent # 550846 filed Jul. 2012, 12 pages.
Document 4, Fonterra Opposition of New Zealand Patent # 550846 filed Dec. 11, 2012, 60 pages.
Document 5, Fonterra Opposition of New Zealand Patent # 550846 filed Nov. 21, 2014, 99 pages.
Document 6, Fonterra Opposition of New Zealand Patent # 550846 filed Dec. 5, 2014, 54 pages.
Document 7, Fonterra Opposition of New Zealand Patent # 550846 filed Jan. 30, 2015, 5 pages.
Document 8, Fonterra Opposition of New Zealand Patent # 550846 filed Jan. 30, 2015, 7 pages.
Document 9, Fonterra Opposition of New Zealand Patent # 550846 filed Jan. 30, 2015, 7 pages.
Document 10, Fonterra Opposition of New Zealand Patent # 550846 filed Feb. 2015, 42 pages.
"Traditional Cheesemaking" [Retrieved on Sep. 22, 2015. Retrieved from the internet: <URL: http://collections.infocollections.org/ukedu/en/d/Jsk17te/5.2.html>].
Patent Examination Report No. 2 issued on Sep. 18, 2015 in Australian Patent Application No. 2013203256, filed May 3, 2005. 6 pages.
Final Office action for U.S. Appl. No. 14/064,372 filed Oct. 28, 2013, mailed Jun. 16, 2015, 13 pages.

\* cited by examiner

CHEESE AND METHODS OF MAKING SUCH CHEESE

CROSS-REFERENCES TO RELATED APPLICATIONS

This application is a divisional of U.S. patent application Ser. No. 13/584,392, filed Aug. 13, 2012, now abandoned entitled CHEESE AND METHODS OF MAKING SUCH CHEESE," which is a continuation of U.S. patent application Ser. No. 12/772,628, filed on May 3, 2010, now U.S. Pat. No. 8,241,691 entitled "CHEESE AND METHODS OF MAKING SUCH CHEESE," which is a continuation of U.S. patent application Ser. No. 11/244,441, filed Oct. 4, 2005, now U.S. Pat. No. 7,713,564 entitled "CHEESE AND METHODS OF MAKING SUCH CHEESE," which is a continuation of U.S. patent application Ser. No. 11/121,537, filed May 3, 2005, now U.S. Pat. No. 7,585,537 entitled "CHEESE AND METHODS OF MAKING SUCH CHEESE," which claims priority to U.S. Provisional App. No. 60/568,029, filed May 3, 2004, and titled "SOFT OR FIRM/SEMI-HARD RIPENED OR UNRIPENED CHEESE AND METHODS OF MAKING SUCH CHEESES", the entire contents of which are herein incorporated by reference for all purposes.

This application is also related to the following U.S. patent applications, all of which are incorporated herein by reference in their entirety for all purposes:

1. U.S. Provisional App. No. 60/568,022, filed May 3, 2004, entitled "Soft or Firm/Semi-Hard Ripened or Unripened Blended Cheeses and Methods of Making Such Cheeses";

2. U.S. Provisional App. No. 60/568,017, filed May 3, 2004, entitled "Methods for Making Soft or Firm/Semi-Hard Ripened and Unripened Cheese,";

3. U.S. patent application Ser. No. 11/122,283, filed May 3, 2005, now U.S. Pat. No. 7,651,715 entitled "Blended Cheeses and Method for Making Such Cheeses,"; and 4. U.S. patent application Ser. No. 11/121,398, filed May 3, 2005, now U.S. Pat. No. 7,579,033 entitled "Methods for Making Soft or Firm/Semi-Hard Ripened and Unripened Cheese and Cheeses Prepared by Such Methods,".

BACKGROUND

Recently there has been an increase in the demand for cheeses that have widely differing performance characteristics. This particular demand is driven in part by the increasing variety of prepared foods in which such cheeses are included. In fact, there often is a need for different performance qualities even for foods of the same general type because of the different ways cheeses are utilized or because the cheese is exposed to differing cooking environments or conditions. Pizzas illustrate this point well because there are so many different types of pizzas. Pizzas, for example, have widely differing crusts, including thick, thin, or somewhere in between. The cheese can also be exposed or wrapped in the edge of the crust. Furthermore, the crust may be completely uncooked or it may be parbaked before being put in the oven with the cheese. Each of these variables potentially impacts the composition of the cheese required to provide satisfactory performance.

Demand for cheese with varying performance characteristics is also driven in part by the significant increase in the different types of baking equipment and conditions that are being used to prepare food products containing cheese. Some baking operations, for instance, require relatively high oven temperatures (e.g., in the range of about 350 to 950° F. (177-510° C.)) with short baking times (e.g., in the range of about 30 seconds to 15 minutes). Such conditions may be used, for instance, in an impingement oven when baking a pizza having a thin crust. Other ovens, such as deck ovens, in contrast, sometimes use a relatively long bake time (e.g., about 6 to 60 minutes) and a correspondingly lower oven temperature (e.g., about 300 to 750° F. (149 to 399° C.)). Instead of baking, some foods topped with or including cheese are prepared by microwaving (e.g., about 1-6 minutes).

Consumer demand for cheeses with improved nutritional content (e.g., nutritionally balanced, lower fat) has also increased the demand for new varieties of cheese.

There are a variety of challenges to providing cheeses that have a composition which satisfies the desired performance characteristics and nutritional qualities. For instance, it can be difficult to obtain the desired concentration level of some ingredients in a cheese. Another problem is developing a process that activates the latent functional properties of certain ingredients. Another problem is that many methods for preparing cheese involve the loss of significant quantities of some cheese components during processing. This can occur, for instance, when such cheeses undergo the heating and stretching process of the pasta filata process. Often the heating is conducted in heated water, which can remove significant amounts of cheese ingredients.

In view of the high demand for cheese and the foregoing shortcomings associated with some existing methods for preparing such cheeses with the desired performance characteristics, there thus remains a need for additional methods for preparing cheeses of these types.

SUMMARY

Methods for preparing a variety of cheese products are disclosed. Systems for preparing such cheeses and slurries, and cheeses produced by the disclosed methods are also provided.

Some of the cheese processing methods involve initially providing a slurry that comprises one or more ingredients that one seeks to incorporate into the final cheese product. The slurry is then combined with a cheese precursor to form an admixture. The resulting admixture is then processed to form the final cheese product. The slurry can be combined with a variety of cheese precursors including a cheese curd ingredient, a mixture of cheese curd ingredients, a coagulum, a cheese curd, a heated mass of cheese (e.g., a heated mass of cheese curd), a dry mixed cheese, or a same day diced cheese. In some methods, the slurry lacks a cheese curd. The slurry in other methods lacks one or more analog cheese ingredients (e.g., an oil, a fat, a protein, a starch, a sequestrant and/or a salt).

A variety of ingredients can be incorporated into the slurry including, but not limited to, a nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

In some methods, the slurry is processed before it is combined with the cheese precursor. Typical processing steps include one or more of the following processes: heating the slurry, subjecting the slurry to high shear conditions, homogenizing the slurry and adjusting the water content of the slurry.

Other methods for preparing a cheese involve combining a slurry with a heated mass of cheese curd to form an admixture and then shaping and cooling the admixture to form the final cheese product. In some of these methods, the slurry contains sufficient starch, nonfat dry milk, gum or cellulose such that the cheese has one or more of the following characteristics (i) a starch concentration of about 0.5 to 20 wt %, or (ii) a nonfat dry milk concentration of about 0.5 to 25 wt %, or (iii) a gum or cellulose concentration of about 0.5 to 20 wt %.

Methods for preparing heated slurries that can be used in the preparation of cheeses are also described herein. Some of these methods involve blending together a liquid and one or more GRAS ingredients to form a slurry and then processing the slurry. Processing typically involves heating the slurry to a temperature of about 90° F. to about 300° F. and performing one or more additional processing steps selected from the group consisting of subjecting the slurry to high shear conditions, homogenizing the slurry and adjusting the moisture content of the slurry.

Various systems for manufacturing a cheese product are provided. Some of these systems include a slurry preparation system that includes (i) a blender adapted to blend a liquid and one or more generally recognized as safe (GRAS) ingredients together to form a slurry, and (ii) a cooker that is operatively disposed to receive the slurry from the blender and adapted to heat the slurry to a temperature of about 90° F. to about 300° F. These systems also include a first mixer operatively disposed to receive the slurry from the slurry preparation system and adapted to mix the slurry with a heated mass of cheese curd to form an admixture. A final processing system is also included which is operatively disposed to receive the admixture and adapted to form a final cheese product.

Such systems can optionally also include a slurry mixing and moisture control subsystem. These subsystems include one or more of the following units: (i) a shear pump adapted to subject the slurry to high shear conditions; (ii) a homomgenizer adapted to homogenize the water and the one or more ingredients in the slurry; and (iii) an evaporator adapted to adjust the water content of the slurry to about 5-95% by weight. The subsystem in these systems is in communication with the cooker and the first mixer and the units within the subsystem are in fluid communication.

The arrangement of some subsystems is such that the shear pump is operatively disposed to receive the slurry from the heater and is in communication with the homogenizer. The homogenizer in turn is operatively disposed between the shear pump and the evaporator and adapted to receive the slurry from the shear pump. The evaporator is operatively disposed to receive the slurry from the homogenizer and in communication with the first mixer.

Some systems also include a second dry or wet mixer that (i) is adapted to heat and knead a mass of cheese curd that is introduced therein, and (ii) is in communication with the first mixer such that the heated mass of cheese that is produced in the first mixer can be transported to the second mixer.

Slurry preparation systems are also provided. Certain of these systems include a (a) blender adapted for preparing a slurry, the slurry comprising water and one or more generally recognized as safe (GRAS) ingredients, (b) a cooker adapted to heat the slurry to a temperature of about 90° F. to about 300° F.; and (c) a slurry mixing and moisture control subsystem. The subsystem itself includes one or more of the following units (i) a shear pump adapted to subject the slurry to high shear conditions; (ii) a homogenizer adapted to mix the water and the one or more ingredients in the slurry; and (iii) an evaporator unit adapted to adjust the water content of the slurry to about 5-95% by weight. In such subsystems, the units making up the subsystem are in fluid communication and the blender, heater and slurry mixing and control subsystem are in fluid communication.

A variety of cheeses (e.g., a soft or firm/semi-hard ripened or unripened cheese product) are provided. Some of these have one or more of the following characteristics (i) a nonfat dry milk concentration of greater than 11% by weight, or (ii) a starch concentration of greater than 11% by weight, or (iii) a gum or cellulose concentration of greater than 11% by weight. Some of these have one or more of the following characteristics (i) a nonfat dry milk concentration of greater than 10% by weight, or (ii) a starch concentration of greater than 10% by weight, (iii) a gum or cellulose concentration of greater than 10% by weight.

Slurries of different compositions are also provided that can be used in the preparation of cheese. Some slurries, for instance, have a temperature of about 90° F. to about 300° F. and have one or more of the following characteristics (i) a starch concentration of at least 12 wt %, or (ii) a dairy solid concentration of at least 12 wt %.

A variety of cheeses (e.g., a soft or firm/semi-hard ripened or unripened cheese product) are provided. Some of these have one or more ingredients added in the form of (i) a slurry of varying composition, and/or (ii) a dry powder used in the preparation of cheese. Some cheeses, for instance have ingredients added via the slurry such that 0.5-25% of an ingredient is added in the final cheese. Other cheeses may have ingredients added via a dry powder such that 0.5 to 15% of an ingredient is added in the final cheese. And still other cheese may have both a slurry and a dry powder added simultaneously such that the combination of slurry and powder result in ingredient amounts of about 0.5 to 25%.

BRIEF DESCRIPTION OF THE DRAWINGS

FIG. 3A depicts a method in which a slurry is combined with a heated mass of cheese. FIG. 3B depicts a method in which a slurry is combined with a curd or curd precursor.

FIG. 4A shows the major subsystems in certain manufacturing systems. FIG. 4B shows a system that can be used to prepare a cheese by combining a slurry with a heated cheese mass. FIG. 4C shows another system that is designed to prepare a cheese in which the slurry is combined with a curd or curd precursor.

FIGS. 4D and 4E illustrate respectively examples for how ingredients can be introduced into a cheese in a parallel or serial fashion.

DETAILED DESCRIPTION

I. Definitions

Figure 1:
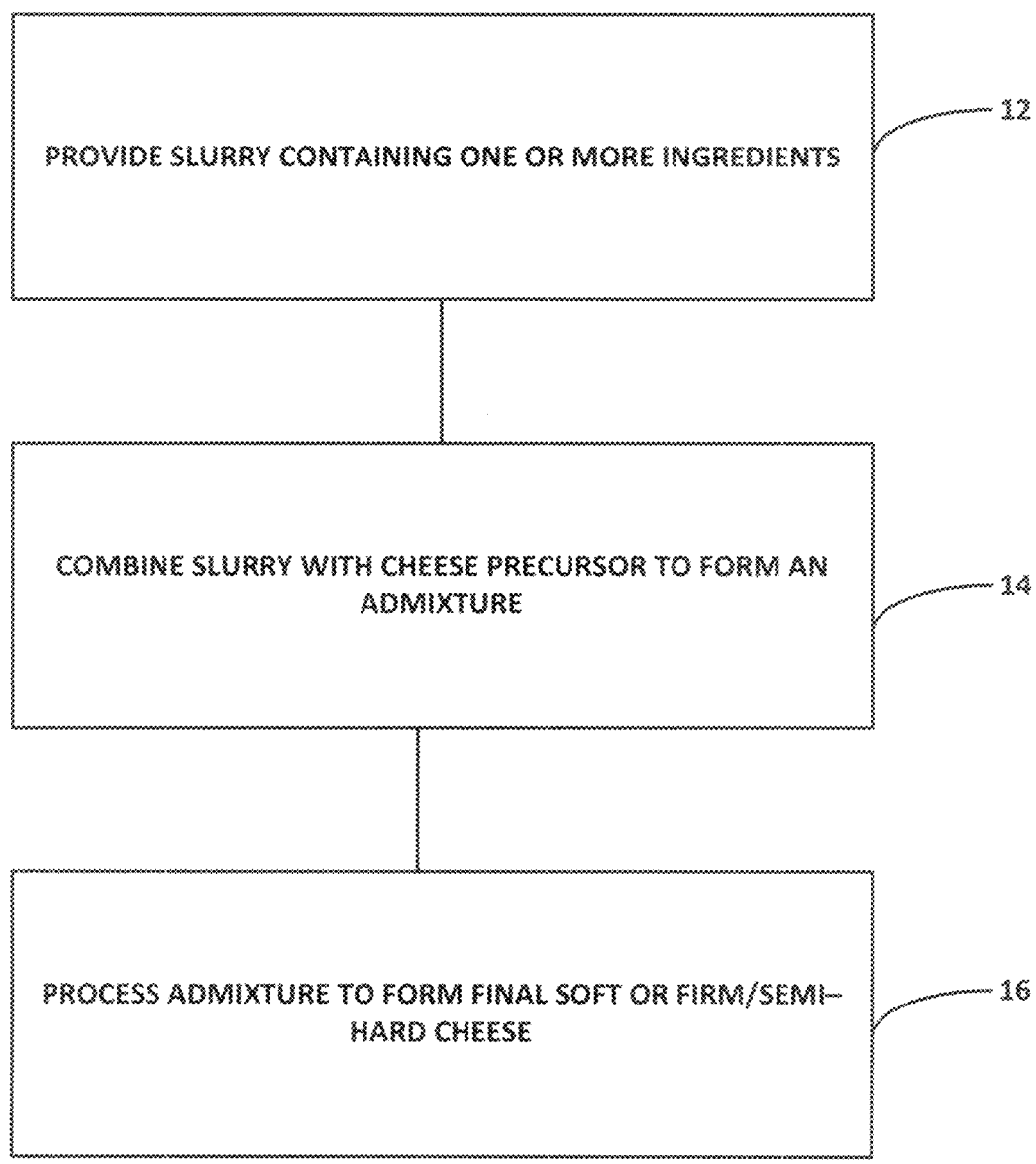
FIG. 1 depicts one example of a general method for making a cheese product using a slurry.

A "soft or firm/semi-hard cheese" as used herein generally includes cheeses that have a percentage moisture on a fat free basis (MFFB) of about 54% or more, by weight. The term includes firm/semi-hard cheeses that have a MFFB, for example, of about 54% to about 80%, by wt., and chesses with a MFFB, for example, of about 58% to about 75%, by wt. The term may also include soft cheeses with a MFFB of greater than about 60%, by wt. The term encompasses a variety of well known cheeses including, but not limited to, Colby, Havarti, Monterey Jack, Gorgonzola, Gouda, Cheshire and Muenster, which are examples of "firm/semi-hard cheeses." Also included in the term are popular "soft cheeses" such as Mozzarella, cream cheese, and cottage cheese. A variety of mozzarella cheeses are included by the term; these can be in the soft or firm/semi-hard category, or in between the two, depending upon their moisture content. Standard mozzarella, for example, is a soft cheese, part-skim mozzarella is between soft and firm/semi-hard, and low-moisture mozzarella and low-moisture part-skim mozzarella are both designated as firm/semi-hard cheeses. The term soft or firm/semi-hard as used herein includes cheeses meeting the CODEX definition of a soft or firm/semi-hard cheese. The term also includes soft or firm/semi-hard cheeses as defined by other local, regional, national or international agencies or organizations.

Cheeses within the "soft or firm/semi-hard" category as defined herein can be prepared using a variety of methods, including conventional methods, as well as by "alternative make" provisions. The term includes, for instance, cheeses made by a process in which a cheese curd is heated and kneaded to improve the stretchability or stringiness of the final cheese, provided the cheese falls within the MFFB parameters set above. This process and related processes are sometimes referred to as a pasta filata process of manufacturing. Cheeses made by this process are known under a variety of names, including mozzarella, pasta filata, provolone, Mexican style, scamorze, and pizza cheese. Cheeses made by alternative make procedures are prepared by alternative methods of making cheeses, so long as the procedure produces a cheese having the same physical and chemical properties of the type of cheese made by a specified process (e.g., a process specified by a regulatory agency) and falls within the MFFB parameters set forth above.

The "soft" and "firm/semi-hard" cheeses that are provided include standard and non-standard cheeses and cheese products having the foregoing moisture characteristics. Standard cheeses are those that satisfy the standards as set forth by a regulatory body with respect to a particular type of cheese. A non-standard cheese is one whose composition does not meet the standard. A soft or firm/semi-hard cheese can also be a processed cheese. A soft or firm/semi-hard cheese can also be ripened or unripened.

"Mozzarella" cheese has a minimum milkfat content of 45% by weight of the solids and a moisture content of more than 52% but not more than 60% by weight. "Low-moisture mozzarella" cheeses have a minimum milkfat content of 45% by weight of the solids and the moisture content is more than 45% but not more than 52% by weight. "Part-skim mozzarella" has a moisture content of more than 52% but not more than 60% by weight, and a milk fat content that is less than 45% but not less than 30% calculated on the solids basis. "Low-moisture part-skim" mozzarella has a moisture content of more than 45% but not more than 52% by weight and a milkfat content, calculated on the solids basis, of less than 45% but not less than 30%. Further details regarding these various mozzarella cheeses is provided by 21 C.F.R. §1.33.155-133.158.

The term "cheese precursor" as used herein refers broadly to any ingredient that is used to prepare a cheese curd, mixtures of such ingredients and subsequent processed forms of the cheese curd other than the final cheese product. Examples of cheese precursors that are ingredients include, but are not limited to, unpasteurized milk (sometimes referred to in the industry as "raw milk"), the growth medium and bacteria used in the cheese making process (sometimes referred to in the industry as "starter"), and cream. Mixtures of such ingredients are also included. One specific example of such mixtures is "vat liquid", which is a term used to refer to a combination of pasteurized milk, starter and cream. The term also includes coagulum, cheese curd, and processed cheese curd (e.g., curd that has been heated and/or stretched to form a homogeneous mass of cheese).

The term "cream" means the liquid milk product high in fat separated from milk which may have been adjusted by adding thereto: milk, concentrated milk, dry whole milk, skim milk, concentrated skim milk, nonfat dry milk or other GRAS ingredients. "Whey cream" is the liquid milk product high in fat separated from whey (cheese, casein, or other), which may have been adjusted by adding thereto: whey, concentrated whey, dry whey, or other GRAS ingredients. "Procream" is the liquid milk product high in fat collected as retentate from a whey filtration process such as microfiltration which may have been adjusted by adding thereto: whey, concentrated whey, dry whey, or other GRAS ingredients.

The term "curd precursor" refers to any soft or firm/semi-hard cheese ingredient, mixture or composition that exists or is formed prior to formation of the cheese curd. The term thus includes, for example, raw milk, starter, cream, cheese vat liquids and coagulum.

II. Overview

Methods for preparing a variety of different types of cheeses are provided, including for example, soft or firm/semi-hard ripened and unripened cheese. The methods that are provided generally involve combining a slurry with a cheese precursor to form an admixture that is subsequently processed to form the final product. The slurry typically contains a liquid (e.g., water, milk and/or cream) and one or more ingredients (added either as a liquid or a dry powder, for example) that are selected in accord with the final cheese product that is desired. Once the slurry and cheese precursor are thoroughly mixed together, the resulting admixture is processed to yield the final soft or firm/semi-hard cheese product. Systems for preparing such cheeses and slurries are also disclosed.

The methods, for instance, can be used to introduce various ingredients, either in the slurry and/or with another component of the cheese, to control: 1) melt and flowability of the final cheese product, which is a measure of how well the cheese melts and flows into a homogenous mass, preferably with little or no individual shreds of cheese still detectable; 2) stretch, which is measure of the ability of the cheese to form interconnected strings when the heated cheese is pulled; 3) texture, which is a measure of chewiness and smoothness; 4) coloring, which is a measure of the actual color of the melted cheese; 5) blister characteristics, which may include size, color and extent of coverage; and/or 6) nutritional composition.

The use of a slurry in the methods disclosed herein may also provide significant improvements in yield. A typical cheese process in its basic approach involves acidifying and coagulating milk to form a coagulum that contains cheese curd and whey, removing the whey from the curd, and then processing the curd into a final cheese product. The whey that is removed in conventional cheese manufacturing often contains many dissolved or suspended ingredients, which often means that a significant quantity of dissolved substances (e.g., protein, fat, carbohydrate and minerals) are lost when the whey is separated from the curd. If any ingredients are added before the whey is separated from the curd, many of these ingredients, because they are at least partially soluble in the whey fraction, are also lost.

As a specific example of the extent of this problem, for each 100 pounds of milk that is used to prepare a cheese, it is not uncommon using conventional cheese manufacturing techniques to only be able to produce 10 pounds of cheese. By using some of the slurry-based methods that are disclosed herein, the yield can be increased in some instances to about 15, 18, 20 22, or 50 or more pounds of cheese for each 100 pounds of milk. Thus, with some methods, the yield can be increased by 1.5-2 times or more. The increase in yield is due in part to the use of slurries that allow ingredients to be integrated into a precursor of the final cheese product when essentially all the ingredients in the slurry are retained, as compared to earlier in the process in which a significant proportion of added ingredients are lost.

One approach is to add the nonfat dry milk to the milk that is used to prepare the cheese. If added at this stage, it is not uncommon for about 75% of the nonfat dry milk to be lost, including proteins, lactose and minerals in the nonfat dry milk. If the nonfat dry milk is instead incorporated into some of the slurries that are provided and the resulting slurry mixed, for instance, into a cheese precursor (e.g., a homogenized mass of cheese curd) as described herein, much, if not essentially all, of the nonfat dry milk may be incorporated into the final cheese product.

In some methods, the slurry is processed so it is in a form that confers useful properties on the final cheese product and/or facilitates preparation of the cheese. Some methods, for instance, utilize a heated slurry that may also have been sheared and/or homogenized. Such processing can influence the performance of the final cheese product in various ways. For example, this processing can be used to achieve higher concentrations of certain ingredients in the final cheese product as compared to traditional approaches. Without intending to be bound by theory, it is believed that the shearing and homogenization process can reduce particle size of the components of some cheese ingredients. These resulting particles because of their reduced size are thus better able to become incorporated into the overall cheese matrix, thereby allowing more ingredient to be introduced into the final cheese product.

The reduced particle size also makes it easier to remove excess water during the manufacturing process to the level desired in later manufacturing stages. The ability to control water content is an important factor in being able to regulate the stability of cheese and thus its shelf life. Reduced particle size also facilitates forming a compact cheese that can be easily processed (e.g., shredded, sliced, or diced). Shearing and homogenization can also be important in reducing the viscosity of the slurry, which aids in various processing steps (e.g., transport of the slurry).

Use of a slurry that has been heated, sheared and/or homogenized during the manufacturing process also is useful in activating, exposing the functionality and/or in hydrating the ingredients, such that the ingredient has different properties than the corresponding unheated ingredients. As a specific example, it can be difficult to incorporate nonfat dry milk into a cheese as a dry powder in certain cheese manufacturing methods because the nonfat dry milk never becomes fully hydrated. This makes the nonfat dry milk susceptible to burning when cooked, for example. By using certain of the slurry-based methods disclosed herein, ingredients such as nonfat dry milk can be better hydrated, thus mitigating against the burning problem. The hydration of other ingredients can have other beneficial results.

Some methods also involve a process in which the water content of the slurry is adjusted. This is useful because the water content in a cheese is an important factor in stability, shelf life and the ability to slice, shred and dice the final cheese product.

In sum, the use of slurries to introduce ingredients into cheeses at certain stages of the manufacturing process can be used to help tailor the performance and nutritional characteristics of the final cheese product.

III. Methods for Preparing Soft or Firm/Semi-Hard Cheese

A. General

FIG. 1 provides a flow diagram that summarizes one general scheme 10 for preparing a cheese product, such as a soft or firm/semi-hard cheese. As this figure indicates, some methods involve providing a slurry 12 that contains one or more ingredients. The ingredients in the slurry are selected to in accordance with the final cheese product that is desired and are described in detail below. The slurries in the methods described herein typically do not contain curd and thus lack cheese curd, but may, for example, instead include other ingredients selected to impart a taste, performance and/or nutritional characteristic on the final cheese product (e.g., mouthfeel, blister size, melt characteristic, texture or color). Some slurries also do not contain ingredients that are commonly used in the preparation of analog cheese. Methods using such slurries thus typically omit one or more or all of the following: an oil, a fat, a protein, a starch, a sequestrant and a salt. Other methods, however, utilize slurries that contain some or all of these ingredients. The slurry is combined 14 with a cheese precursor to form an admixture. This admixture is then processed 16 to form the final cheese product.

Figure 2A:
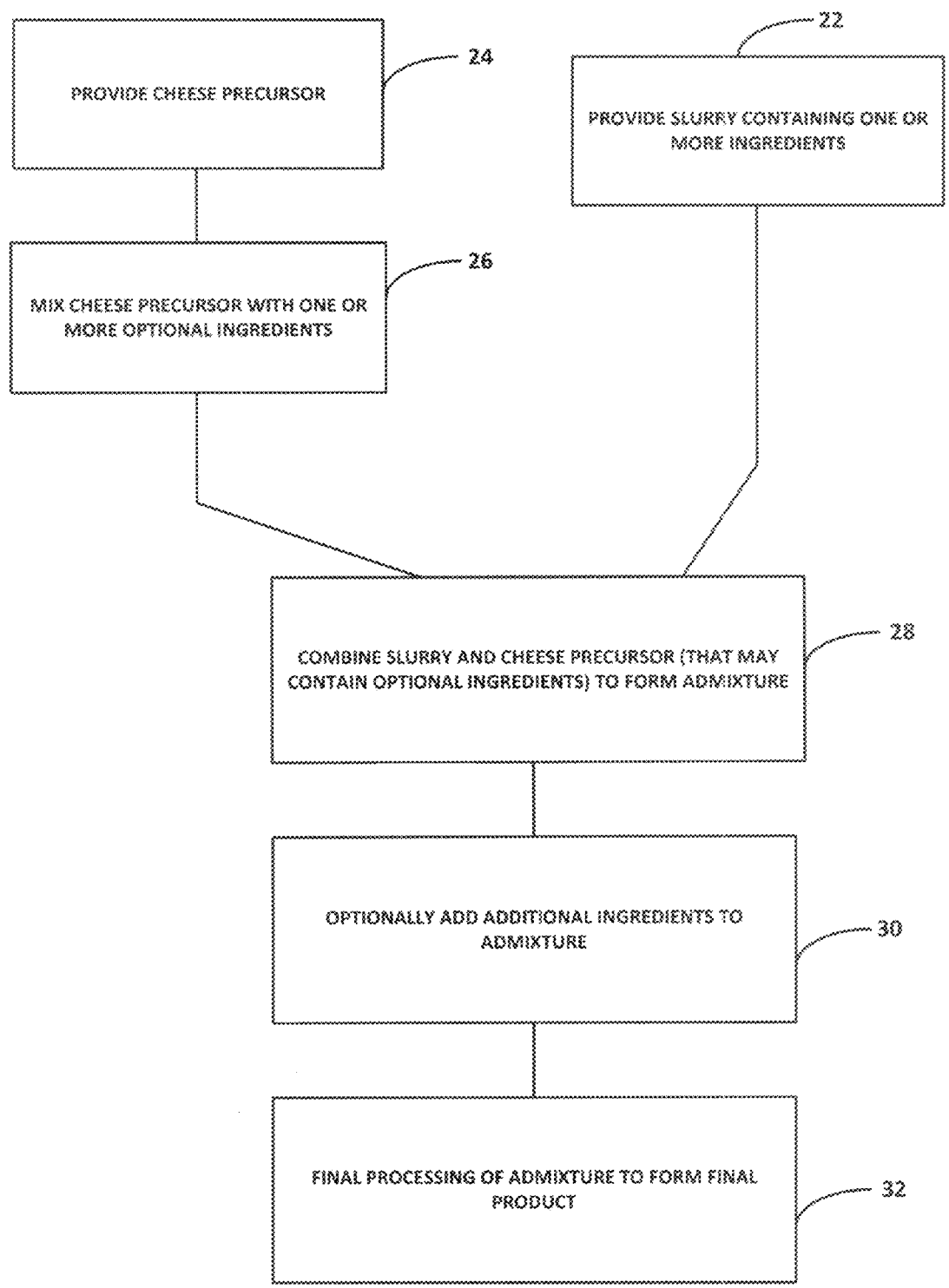
FIGS. 2A-2C show different examples of general methods for making a cheese product using a slurry.

Another example of a general method is shown in FIG. 2A. This process 20 involves providing 22 a slurry that contains one or more ingredients and providing 24 a cheese precursor. In this particular method, the cheese precursor (e.g., milk, cream, coagulum and/or curd) is mixed 26 with one or more ingredients. This mixture is then combined 28 with the slurry to form an admixture. Additional ingredients can subsequently be added 30 to the admixture, thus providing another opportunity to control the composition of the final cheese product. The admixture is then subjected to final processing 32 to obtain the desired cheese product. Although the method in FIG. 2A includes two processes in which additional ingredients are added (i.e., processes 26 and 30), other methods include only one or neither of these processes.

Figure 2B:
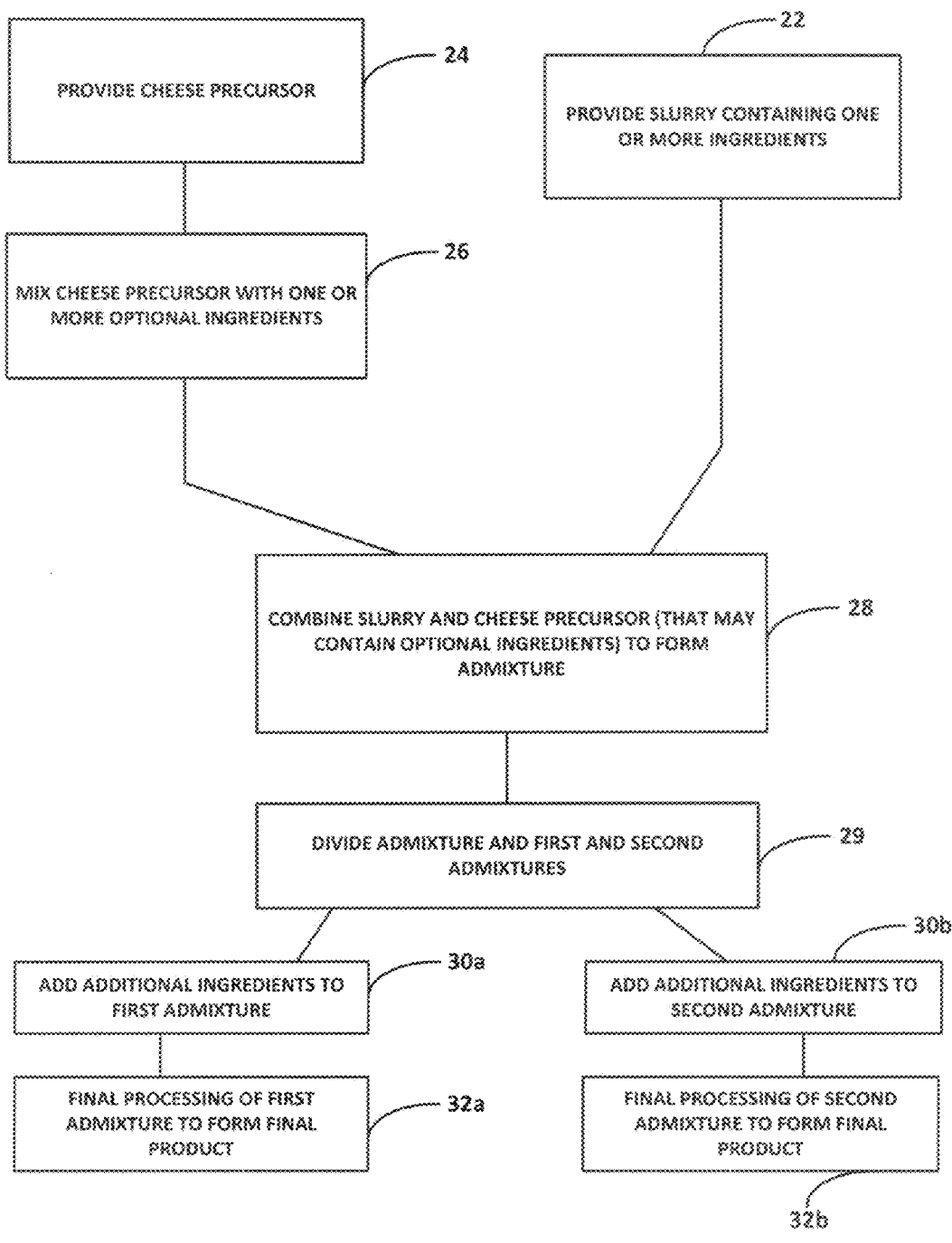

FIG. 2B presents a variation of the general method shown in FIG. 2A. In this method 30, a cheese precursor is provided 24, mixed 26 with one or more ingredients and then combined 28 with a slurry 22 to form an admixture. In contrast to the method shown in FIG. 2A, however, the resulting admixture is then divided 29 into multiple portions (e.g., a first and second admixture). Each admixture is then processed separately. For instance, a first ingredient or set of ingredients can be added 30a to the first admixture portion and the resulting mixture further processed 32a to form a first cheese product. A second ingredient or set of ingredients (typically different from the first ingredient or ingredient set) is then added 30b to the second admixture portion and then subjected to further processing 32b to form a second final cheese product. This approach is useful, for instance, to prepare different cheeses with similar base compositions but somewhat different ingredients. Although FIG. 2B shows a method in which the initial admixture is divided into only two separate portions, it should be understood that the initial admixture could be divided into a greater number of portions with parallel processing of each portion as indicated in FIG. 2B. Further, although the method in FIG. 2B shows ingredients being added 26 to the cheese precursor before the cheese precursor and slurry are mixed, this step need not be performed in all methods.

Figure 2C:
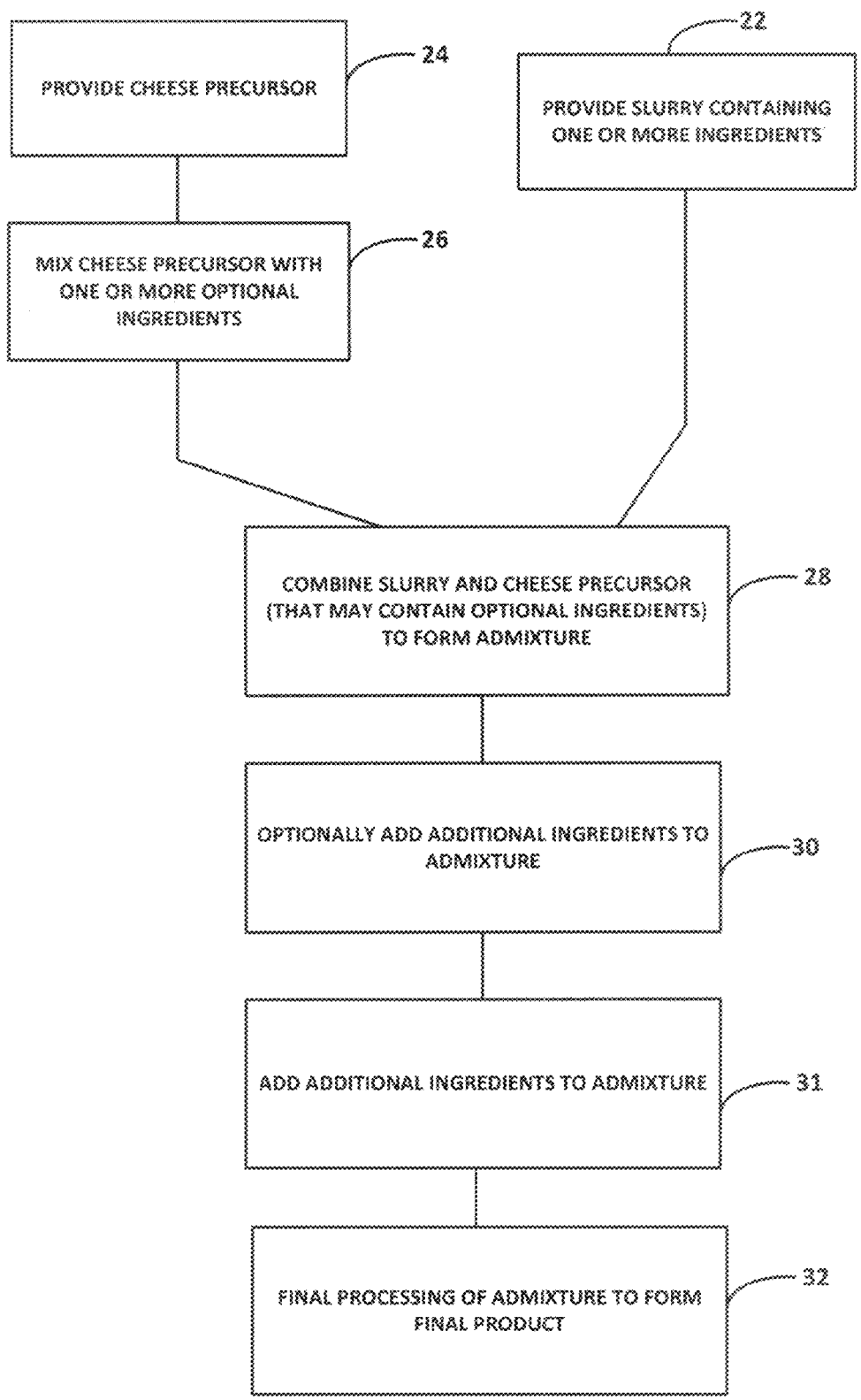

A second variation of the method shown in FIG. 2A is depicted in FIG. 2C. In this method 40, the providing 22, 24 and mixing 26 processes are as described with respect to FIG. 2A. In this particular method, however, once the slurry and cheese precursor have been combined 28, multiple ingredients are added in a serial process (as compared to the parallel process illustrated in FIG. 2B). Thus, for example, one or more first ingredients are added 30 to form an initial admixture and then one or more second ingredients added 31 to form a final admixture, which is subsequently further processed 32 to form the final cheese product. The first and second ingredient can be the same or different. The first and second ingredient can also be a single ingredient or a plurality of ingredients. It should further be understood that although FIG. 2C illustrates a method in which there are two serial additions of ingredients that more serial additions could be made.

Methods of the general type shown in FIG. 2C are useful, for example, when separate additions of ingredients allows for improved incorporation into the cheese (e.g., adding all the ingredients at once may prevent the ingredients from becoming fully mixed into the admixture).

The various primary processes involved in the methods that are provided, such as those described in FIGS. 1 and 2A-2C, are discussed in detail in the following sections.

1. Slurry Preparation and Pre-Mixing Process

The process of providing the slurry can comprise several aspects. Some methods, for example, generally involve blending a liquid (e.g., water, oil, milk and/or cream) and one or more ingredients to form the slurry. The resulting slurry is then subjected to a pre-mixing process to adjust the slurry to a form that will integrate well with the cheese precursor with which the slurry is mixed. The pre-mixing process usually includes cooking the slurry, typically to about 90-300° F., 90-293° F. or 100-250° F. (38-121° C.), but this is not mandatory. This pre-mixing processing also optionally includes one, two or all of the following processes: (1) subjecting the slurry to high shear conditions, (2) homogenizing the slurry, and/or (3) adjusting the water content of the slurry, usually to about 5-95%, or 15-80% by weight. As noted above, these processes are helpful in controlling processing parameters and the ultimate performance characteristics of the final cheese product.

Different methods can incorporate different combinations of two or all three of the foregoing optional processes. So, for example, in some methods, the pre-mixing processing involves (1) and (2) but not (3). Other processes include (1) and (3) but not (2). Still other pre-mixing processes include (2) and (3) but not (1). And still other processes include (1), (2) and (3). The other remaining combinations can also be utilized depending upon the particular requirements of an application. In some instances, it is sufficient to simply shear the slurry without homogenizing it. But the pre-mixing process may involve both, in which case the slurry is first typically sheared and then homogenized, although the order can be reversed.

In some methods, some of the pre-mixing processes are optionally carried out at the same time (e.g., subjecting the slurry to high shear conditions while homogenizing the slurry; or heating the slurry while subjecting it to high shear conditions and/or homogenizing the slurry). Cooking can optionally be performed during the shearing and/or homogenizing. In general, however, the pre-mixing processing steps conclude by adjusting the water content of the slurry.

Some ingredients need to be subjected to high shear conditions to become functional (e.g., hydrated or converted to a form that displays functional binding groups). High shear conditions as used herein generally refers to conditions in which 10,000 to 500,000 $s^{-1}$ of shear is applied. In some methods, the slurry is typically sheared by a high-shear mixer or colloid mill, at a temperature of about 90 to 293° F. (15 to 82° C.) for about 0.01 to 0.5 seconds.

Homogenization of the slurry, if performed, generally involves the process of reducing the particle size of fluid products under conditions of extreme pressure, shear, turbulence, acceleration and impact, to make them more stable and have a better texture. The effect is typically achieved by forcing the slurry through a special homogenizing valve at a very high pressure. Homogenization can be done in one or multiple steps. For most methods, two steps are sufficient. It is common that the main homogenization takes place in the first homogenization valve and a mild homogenization in the second valve. The second homogenization valve can enhance the product quality. This step, for example, can break down newly formed fat globule clusters formed directly after the first valve due to re-agglomeration. Homogenization is usually conducted at a temperature of about 90-293° F. (32-145° C.) or 100-250° F. (38-121° C.) for about 0.01 to 0.5 seconds.

As indicated above, if the water content of the slurry is adjusted, the moisture content is generally adjusted to about 5-95 percent, in some instances from about 15-80 percent, in other instances 20-75%, and in still other instances 30-60%. After such processing, the slurry that is mixed with the cheese precursor, generally has a temperature of about 100-180° F. (37-83° C.), or about 120-165° F. (48-74° C.). It also typically has a viscosity of 1000 to greater than about 1,000,000 centipoise in this temperature range.

2. Exemplary Methods for Providing Cheese Precursor

As noted above, various cheese ingredients or mixtures thereof can serve as the cheese precursor. Other cheese precursors include compositions formed during processing of the starting ingredients, including, for example: 1) the pasteurized milk; 2) cheese milk formed by the acidification of the pasteurized milk; 3) the coagulum formed during the coagulation process; and/or 4) the cheese curd.

Cheese curd can be prepared, for example, from pasteurized cow's milk, buffalo milk, goat's milk, or other milk source (e.g., concentrated milk, reconstituted milk or milk protein powders). The milk is acidified to form cheese milk. The acidification step can be performed either microbially or directly, or by a combination of both microbial and direct acidification. Microbial acidification is accomplished by the addition of a starter culture of one or more lactic acid-producing bacteria to the milk, and then allowing the bacteria to grow and multiply. When making a mozzarella variety cheese, a bacterial starter culture composed of coccus, rods, or a combination of both is preferably used. In some methods of acidification, an acid added as a processing aid, such as acetic acid (e.g., vinegar), phosphoric acid, citric acid, lactic acid, hydrochloric acid, sulfuric acid, or glucono-delta lactone (GdL), lactobionic acid, etc., is added to standardize pH and is followed by addition of microbial starter to complete the acidification process.

Following addition of the microbial and/or GRAS acids, the cheese milk is coagulated to form a coagulum that consists of cheese curd and whey. Rennet, or another suitable enzyme, is typically added to the milk to enhance the coagulation activity. The resulting coagulum is cut and the whey drained off to obtain the cheese curd. The curd can optionally be scalded (cooked) for about 0.08 to 1.0 hours at about 86-120° F. (30-49° C.)° C.

When dairy milk is used as a precursor, the sweet cream fraction of the milk, or a portion thereof, may be separated and replaced by other types of creams and/or fats prior to acidification. For example, the sweet cream may be replaced by whey cream and/or pro-cream (i.e., a mixture of protein and cream) that is included with the whey fraction that is separated from the cheese curd. The replacement of the dairy sweet cream, or a portion thereof, with the whey cream and pro-cream reduces waste by making use of the whey cream and pro-cream, as well as making the higher value sweet cream available for sale in the marketplace.

In some methods, the cheese curd is heated and kneaded in a cooker/mixer to form a heated mass of cheese curd (also referred to simply as a heated mass of cheese). The heating and kneading process is generally done at a temperature of about 120-180° F. (48-82° C.) for a time of about 1-15 min. Typically, the resulting mass has a temperature from about 120-150° F. (48-66° C.). The heating and kneading process can be conducted simultaneously or separately.

The heating and kneading process is generally conducted under low shear conditions. Heating can be conducted, for instance, in a kneading mixer/extruder via 1) immersion in hot water or brine, 2) direct steam injection, 3) indirect heating via an indirect heat exchanger, and/or 4) by microwave. The steam injection option generally involves releasing live steam into the kneading and stretching chamber. When live steam is used to heat the curd, the steam condensate is absorbed by the curd and forms part of the final mass of cheese. When using live steam in the mixer/cooker, typically the water content of the curd immediately prior to entering the mixer/cooker is about 45 to 65 wt. %, and sufficient steam is released into the kneading and stretching chamber such that the water content of the mass of cheese immediately after exiting the machine is up to about 5 percentage points higher, e.g., about 0.5 to 10 points higher. Often, it will be about 2.5 to 8.5 points higher. So, for example, if the water content of the curd entering the machine is 45 wt. %, then usually the amount of injected steam that is used to bring the curd up to the necessary temperature to obtain a homogenous mass of cheese will be an amount that raises the water content to no more than about 55 wt. %. Indirect heating can be accomplished, for example, by conduction, through the wall of the kneading and stretching chamber, e.g., by use of a hot water jacket.

In some methods, heating and kneading can be performed in the absence of any exogenous water. By "exogenous water" is meant water that is used to bathe the curd and which is subsequently separated from the homogenous cheese mass that is formed. A shortcoming of the use of exogenous water during the heating and kneading process is that, when the water is separated, valuable protein, fat, and other solids that otherwise would be bound up in the finished cheese are removed. Various cookers can be used to heat the cheese curd in this fashion. One option is the RotaTherm™ cooker available from Gold Peg International Pty. Ltd. (Moorabbin, Vic, Australia).

Kneading is often accomplished by working the heated cheese curd with pressure via single or dual helical intermeshing screws. The whole of the heating and kneading step is sometimes referred to as a plasticization or pasta filata process, which refers to the heating of curd to around 120-155° F. (48-69° C.) and kneading the hot curd. Successful plasticization of the curd requires that the viscoelastic paracasein matrix undergoes limited flow and stretches without breaking. Plasticization is believed to be accompanied by changes at a microstructure level within the curd, including partial aggregation and tightening of the paracasein gel matrix followed by formation of linear paracasein fibers with high tensile strength. The cheese fat coalesces into elongated pools entrapped between paracasein fibers showing their same orientation. This process aids in obtaining the proper functionality in the final product.

The heating and kneading process described herein ensure complete mixing of the heated curd. This is important because incomplete mixing results in the separation of fat and water and the loss of these ingredients, as well as other such as fat, lactose and minerals.

3. Mixing of Slurry and Cheese Precursor

The slurry is combined with a cheese precursor to form an admixture. So, for instance, the slurry can be combined at any stage along the process for preparing a soft or firm/semi-hard cheese as outlined in the preceding section. Mixing of the slurry with a cheese precursor can be accomplished using standard mixing apparatus that are known in the industry.

In some methods, the slurry is mixed with a heated mass of soft or firm/semi-hard cheese that has undergone the heating and kneading process that is associated with the pasta filata process. For ease of reference, cheese curd that has undergone such a heating and kneading process is simply referred to herein as a "heated cheese mass." In methods such as this, the mixing typically is performed at a temperature of about 120 to about 170° F. (49-77° C.). The temperature in some applications is relatively high, such as between 150-170° F. In other methods, the temperature is at or slightly below that of pasteurization (65° C., 150° F.), for example in the range of about 120-150° F. (49-65° C.). Mixing is usually conducted for about 2-15 or 5-10 minutes. Mixing is generally performed under low shear conditions.

Combining the slurry with the heated cheese mass is a useful approach because the slurry can be fully worked into the heated cheese mass with minimal loss of ingredients during the mixing process and subsequent processing steps. This thus is useful in reducing waste flow from the manufacturing process, thereby conferring significant cost benefits and reducing waste disposal issues.

4. Optional Addition of Ingredients

Some methods optionally involve the further addition of ingredients at points along the cheese preparation process other than the blending of ingredients with a liquid to form the initial slurry. Ingredients can be added, for example, to the cheese precursors listed above (e.g., to the curd ingredients, the coagulum and/or the cheese curd). These ingredients can be added as liquids and/or powders.

In certain methods, ingredients are added to the heated cheese mass, the processed slurry (e.g., after the slurry has been heated, homogenized, sheared and/or the water content adjusted) or the admixture formed once the heated slurry and heated cheese mass are mixed together. These ingredients are often added in a dry form (e.g., as a powder), but in some instances can be added in liquid form. Powdered solids can be added using any of a number of conventional approaches, including sprinkling the solids onto the cheese mass, usually across the entire surface of the cheese mass and typically after application of agents or ingredients in liquid form, if any. Liquid agents or ingredients can be sprayed down onto the surface of the cheese mass as it passes through the mixing chamber, usually in a spray that covers substantially the entire surface of the cheese.

5. Final Processing

Once the slurry and cheese precursor have been combined, the admixture is further processed to obtain the desired final soft or firm/semi-hard cheese product. The particular processing steps required, depend in part upon the cheese precursor with which the slurry is mixed. If the cheese precursor is a cheese ingredient such as milk or cream, for instance, then the final processing involves completing the cheese manufacturing process to form a cheese curd that contains the added slurry, followed by its further processing to yield the final product. If the slurry is mixed with a cheese curd, the slurry/curd mixture can optionally be heated and stretched in a pasta filata type process, or this mixture can be pressed together to form a final cheese product. Thus, in some instances, final processing simply involves compressing and molding the cheese curd using conventional cheese compression and molding operations to form a mass of cheese.

If the process involves a heating of the cheese curd, the still-warm cheese (e.g., at a temperature in the range of about 110-175° F. (43-80° C.)) can be formed into any desired shape depending upon the ultimate intended use. General options include, but are not limited to, 1) forming relatively large pieces of cheese which are packaged; 2) comminuting the cheese into smaller pieces that are packaged without freezing but instead refrigerated; 3) comminuting, packaging and freezing the cheese, and 4) comminuting, freezing, then packaging the cheese.

In some methods, for instance, the admixture is extruded as a continuous dimensionally flat Ribbon™, which is discharged into a cold sodium chloride brine channel or tank, for example as described in U.S. Pat. No. 4,339,468 to Kielsmeier or U.S. Pat. No. 5,200,216 to Barz et al. (both of which are incorporated herein in their entirety). The cheese Ribbon™ is sometimes contacted with cold sodium chloride brine (in one or more tanks or vessels) until its core temperature drops to about 75° F. (24° C.) or below. Then the cooled Ribbon™ can be cut into segments having dimensions suitable for the intended use of the cheese.

Other options include: 1) floating the cheese in a coolant; 2) placing the cheese on a perforated belt and spraying coolant on the cheese surface; 3) placing the cheese on a solid belt and spraying coolant on the underside of the belt; 4) transfer through a cooling chamber; and 5) refrigeration of the heated cheese.

If a string cheese is the desired product [e.g., a cheese having a diameter of about ⅛ to 1.0 inch (0.32 to 2.54 cm.)], the segments of the string are generally about 1½ to 12 inches (4 to 30.5 cm) long. If the string cheese is to be baked only while enclosed in pizza crust (e.g., in a stuffed crust pizza), it typically is unnecessary to age the cheese before using it. If desired, the string cheese can be frozen and stored.

The warm cheese can also be molded/extruded into blocks of any of a variety of sizes that are convenient. Some blocks, for example, are about 4 inches high, 4-8 inches wide, and 4-24 inches long.

If the finished cheese is to be used as an exposed topping for a pizza, then the continuous Ribbon™, typically is rectangular in cross section, and can be cut into loaves, for example having a width of about 4 to 36 inches (10 to 92 cm.), a height of about ¹⁄₁₆ to 4 inches (0.15 to 10 cm.), and a length of about 4 to 36 inches (10 to 92 cm.). The loaves can then be further cooled in sodium chloride brine, for example to a core temperature in the range of about 26 to 75° F. (−16 to 24° C.), and then removed from the brine and comminuted, and the pieces individually quick frozen, for example by the process described in U.S. Pat. No. 5,030,470 to Kielsmeier, et al., which is hereby incorporated herein by reference.

Depending on the composition of the cheese, it may be preferable to store it for a time [e.g., about 7 to 21 days, at about 35 to 45° F. (2 to 7° C.)] after it is removed from the last brine tank and before it is comminuted and frozen. However, as described in U.S. Pat. No. 5,200,216 (Barz et al.), if the process is controlled such that the cooled cheese removed from the brine has a moisture content of about 45 to 60 wt. %, a milk fat content of at least about 30 wt. % (dried solids basis), and a combined moisture and wet milk fat content of at least about 70 wt. %, the cheese can be frozen immediately and will still perform satisfactorily when heated under a variety of conditions.

The final processing procedure can also be as described in U.S. Pat. No. 5,902,625, which is incorporated herein by reference in its entirety for all purposes.

Methods based on the foregoing processes can be conducted in a batch format or continuously. Batch methods, for example, involve providing batches of slurry and cheese precursor that are subsequently combined in batches. The resulting mixtures are subsequently processed to obtain the desired final cheese product. The process is then repeated.

In continuous methods, at least the slurry preparation process and the process in which the slurry is combined with the cheese precursor is conducted in a continuous process. In some methods, essentially each of the steps listed above are conducted continuously such that slurry preparation, cheese precursor preparation, combining of the slurry and precursor, optional addition of ingredients, and final processing steps are all continuously ongoing.

B. Exemplary Methods

Figure 3A:
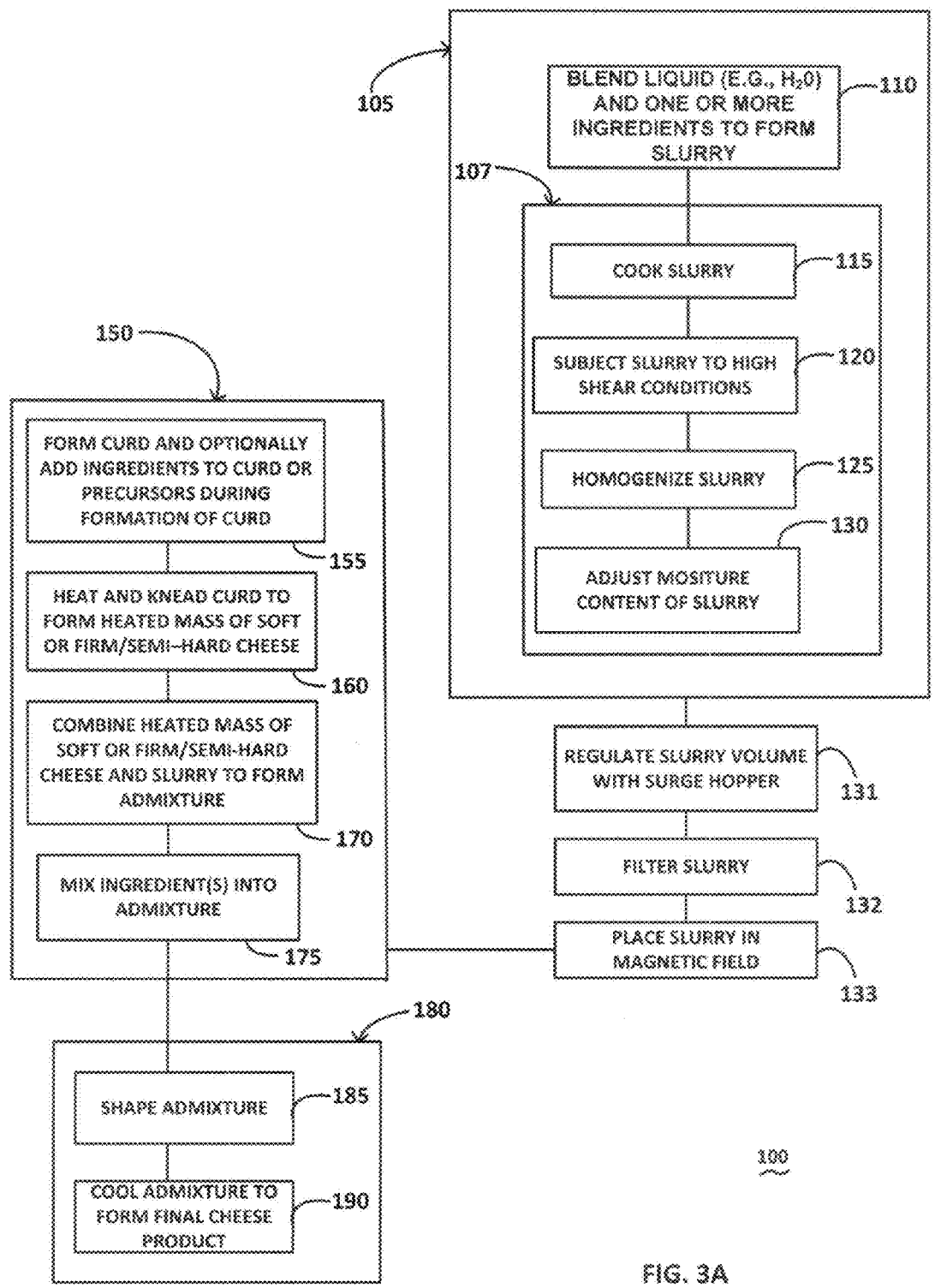
FIGS. 3A and 3B show in schematic form other examples of certain methods that are disclosed herein to prepare cheese.

FIG. 3A provides a specific example of a method in which a heated slurry and heated cheese mass are combined to form an admixture that can subsequently be processed to yield a final cheese product, such as a soft or firm/semi-hard cheese product. As noted above, in some instances the slurry is heated because this can be useful in increasing the amount of certain ingredients that can be incorporated into the final cheese product and in unmasking the functionality of some ingredients.

This particular method 100 includes a slurry preparation process 105 in which a liquid (e.g., water, milk and/or cream) and one or more ingredients are blended 110 together to form the initial slurry. The pre-mixing process 107 involves cooking/heating 115 the resulting slurry to a temperature of about 90-300° F. This heated slurry is subsequently subjected 120 to high shear conditions and then homogenized 125 to obtain a slurry in which the ingredients are of the desired particle size. Thereafter, the water content of the heated slurry is adjusted 130, typically to about 5-95 wt. %. The slurry is transferred to the combining and mixing state 170 through the use of a pump at the discharge of a surge hopper, which maintains the slurry at a constant volume 131. As the slurry is transferred, it may be filtered 132 to remove any large particles formed in the slurry during the cooking/heating step 115 (or other extraneous materials), and also exposed to a magnetic field 133 to remove any metal fragments in the slurry generated by metal to metal contact of the moving parts of the process equipment.

As further shown in FIG. 3A, the process of providing 150 a cheese precursor in this particular method involves several processes to obtain a heated cheese mass. The process is initiated by forming 155 a cheese curd. Once formed, the cheese curd is heated and kneaded 160 to form a heated cheese mass. During the heating process, the curd is typically heated to about 120-155° F.

Once the heated slurry and heated cheese mass have been formed, they are mixed 170 together to form an admixture. This particular method includes a process of mixing in 175 one or more optional ingredients into the admixture. But as noted above, such additions are optional and not all methods include this process. Furthermore, although this particular method shows the additional ingredients being added to the admixture of slurry and heated cheese mass, the ingredients could also be added to the slurry or to the heated cheese mass just prior to mixing. Alternatively, the slurry, heated cheese mass and ingredients can be combined simultaneously. The admixture that is formed is subsequently processed 180 to form the final soft or firm/semi-hard cheese product. In the particular method depicted in FIG. 3A, final processing 180 involves shaping 185 the admixture into a desired form and cooling 190 the shaped cheese to form the final cheese product. Although FIG. 3A shows the final processing step to first involve the shaping process followed by the cooling process, this order can be reversed or performed simultaneously.

Although the particular method illustrated in FIG. 3A shows the slurry and heated cheese mass being mixed together, in other methods the slurry is mixed with another cheese precursor (e.g., milk, coagulum or unprocessed cheese curd). Systems for performing such methods are shown in FIG. 4C.

Figure 3B:
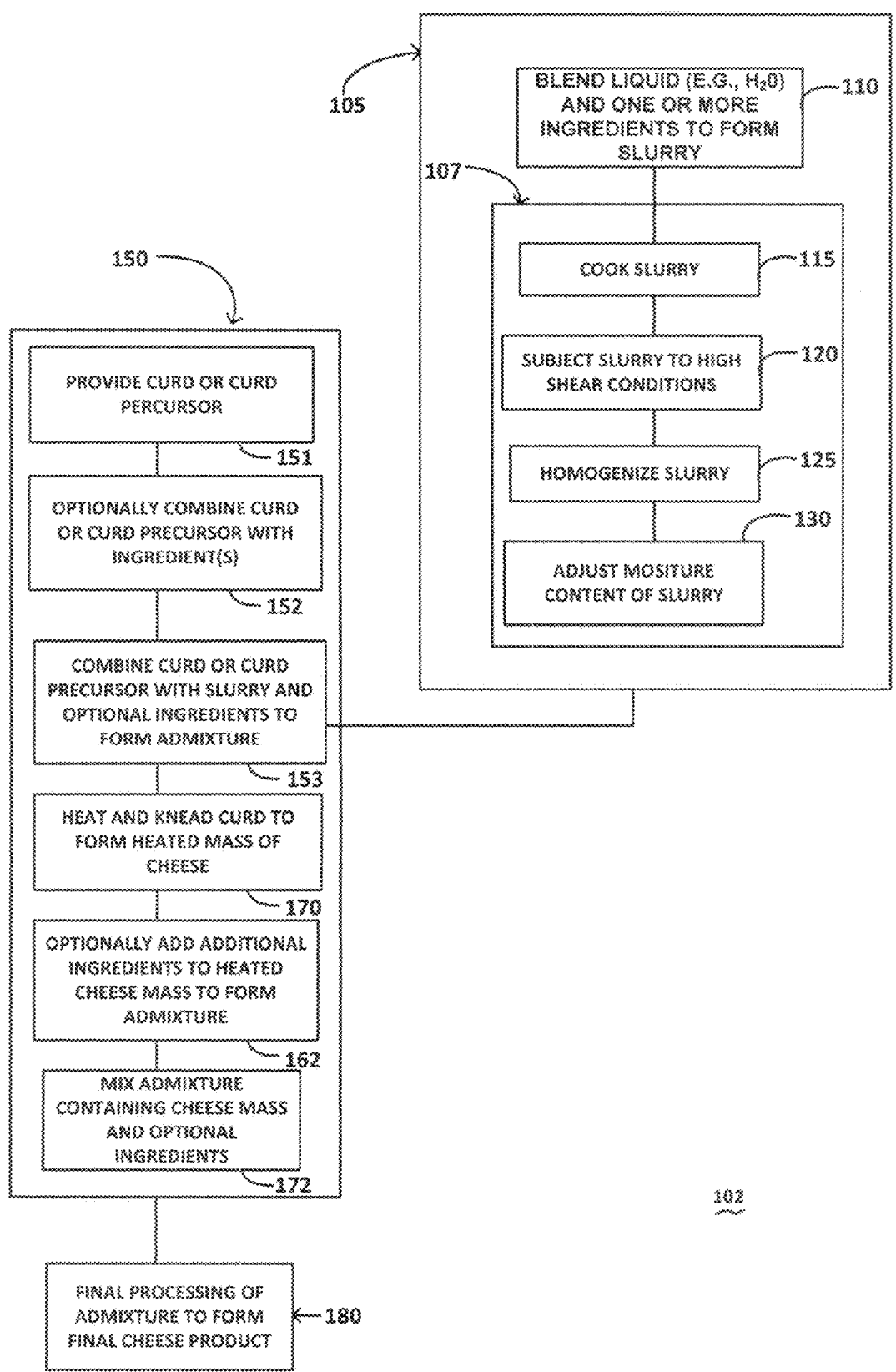

Another example of a method for preparing soft or firm/semi-hard cheese is shown in FIG. 3B. In general, method 102 illustrates certain methods in which a curd or a curd precursor is combined with the slurry, instead of a heated mass of cheese. In the method illustrated in FIG. 3B, a slurry is provided 105 as described with respect to FIG. 3A. The process of providing 150 a cheese precursor in methods of this type, however, involves providing 151*a* curd or curd precursor. In this particular method, one or more additional ingredients can be mixed 152 into the curd or curd precursor, but not all methods include such additions. The curd or curd precursor is then combined 153 with the slurry to form an admixture. The resulting mixture may then be heated and kneaded 171 to form a heated mass of cheese as in a pasta filata process. Method 102 also includes a process in which one or more additional ingredients are added 162 and mixed 172 with the admixture. Here, too, however, not all methods include such additions. The admixture is then processed 180 to form the final soft or firm/semi-hard cheese product.

The final processing 180 of each of the exemplary methods shown in FIGS. 3A and 3B can involve any of the processing options described above or generally known in the art. So, for example, in some methods final processing involves individually quick freezing pieces of the cheese as described in U.S. Pat. No. 5,030,470. Other methods involve a same day dice procedure such as described, for example, in U.S. Pat. No. 5,200,216. In still other methods, the cheese is not comminuted but formed into blocks that are directly packaged and refrigerated. Those of skill will recognize that a variety of other processing options are available. Further examples are provided in the section on "Final Processing" above.

IV. Ingredients

A. General

A number of different types of generally recognized as safe (GRAS) ingredients can be incorporated into the slurry and optionally added at other stages of the overall manufacturing process as described herein. If added at a stage other than the slurry, most ingredients can generally be added as a powder or as part of a solution. The ingredients that are incorporated are selected, for example, to tailor the performance, nutritional, and taste characteristics of the final soft or firm/semi-hard cheese product.

As noted above, some of the ingredients included in the slurry generally fall into two general categories: 1) ingredients that one seeks to incorporate at relatively high concentration levels; and 2) ingredients that need to be heated and/or hydrated to become functionalized, i.e., to be converted into a form that has the chemical and/or physical properties that are important for imparting the desired characteristics to the final soft or firm/semi-hard cheese product. But a variety of other ingredients can also be included in the slurry.

Examples of such ingredients include, but are not limited to, nonfat dry milk, a milk protein, an acidity regulator, an acid, an anticaking agent, an antifoaming agent, a coloring agent, an emulsifier, an enzyme preparation, a flavoring agent, a firming agent, a food protein, a gelling agent, a preservative, sequestrants, a stabilizer, a starch, a thickener, an oil, a fat, a cheese powder, a salt, a nutritional supplement, an acid, an enzyme, a neutraceutical, a carbohydrate, a vitamin, and a mineral. Examples may further include procream, whey cream, a dairy solid, and foodstuffs of vegetable, fruit and/or animal source. The foodstuffs may include fruit, vegetables, nuts, meat, and spices, among other foodstuffs.

Examples and additional specific information regarding the types of ingredients that can be incorporated to tailor the performance, nutritional and taste characteristics of the final soft or firm/semi-hard cheese product follow.

Dairy Solids. A dairy solid can be added to improve various characteristics of the final cheese product such as: firming the cheese, improving water binding capacity, improving the melt appearance of the cooked cheese, and/or increasing the blistering of the cooked cheese. Dairy solids that can be utilized include, but are not limited to, whey protein concentrate, casein hydrolyzate, milk fat, lactalbumin, cream, milk protein concentrate, milk protein isolate, lactose, casein, whey protein isolate, hydrolyzed whey protein, denatured whey protein, skim cheese powder, natural casein isolate, nonfat dry milk, delactose permeate, procream, mixer overflow liquid, and milk minerals. In general, dairy solids can be incorporated into the final product from about 0.5-25 wt. %.

Incorporation of a dairy solid such as nonfat dry milk into a heated slurry is one approach for obtaining relatively high concentration levels in the final product. For example, the dairy solid concentration in some soft or firm/semi-hard cheeses that are prepared according to the methods disclosed herein can be at least 11, 12 or 13 wt. %, and can include, for example, up to about 16, 17, 18, 19, 20 or 25 wt. % of the final product. Thus, the concentration of the dairy solids in the slurry is generally adjusted such that the level of dairy solid in the final cheese product is about 0.5-25, about 3-18, about 4-16, or about 11-25 wt. %. This means that the concentration of the dairy solid in the slurry itself is generally within the range of about 0.5 to 95 wt. %, for example about 10-80%, or about 30-70%, by wt.

Starches. Incorporating starches into the heated slurry is also beneficial in some instances because the functionality of some starches is increased when heated, hydrated and/or subjected to high shear conditions. Once functionalized in this manner, the starch can thicken or gel to bind to proteins in the cheese (e.g., casein). In general, starch can be incorporated into the final product in the range of about 0.5-20 wt. %.

Some methods add starch such that the starch concentration in the final cheese product is at least 4, 6, 11, 12, 13 or 20 wt. %. Thus, in some instances, the starch concentration can range from about 4-20 wt. % or from about 5-16 wt. % in the final cheese product. This means that the starch concentration in the slurry itself is typically about 0-95 wt. %, for example about 0.5-50%, or about 1-25% by wt.

A number of different types of starches can be incorporated into the final cheese product. Suitable starches include vegetable starches (e.g., potato starch, pea starch, and tapioca) and grain starches (e.g., corn starch, wheat starch, and rice starch). Specific examples of suitable corn starches include dent corn starch, waxy corn starch, and high amylose corn starch. The starches can be used individually or in combination.

The starch can be modified or native. Modified food starches differ in their degree of cross-linking, type of chemical substitution, oxidation level, degree of molecular scission, and ratio of amylose to amylopectin. Examples of some commercially-available modified food starches that are suitable include Mira-Cleer 516, Pending 200, Purity 660, Batterbind S.C., Penbind 100, MiraQuick MGL, Novation 3300, and Gel-n-Melt. A suitable commercially-available native (unmodified) starch is Hylon V.

Mira-Cleer 516, from A. E. Staley Company, is a dent corn starch that is cross-linked and substituted with hydroxypropyl groups. The cross-linking increases its gelatinization temperature and acid tolerance. The hydroxypropyl substitution increases its water binding capability, viscosity and freeze-thaw stability. MiraQuick MGL, also from A. E. Staley Company, is an acid-thinned potato starch. The acid thinning breaks amylopectin branches in the starch, creating a firmer gel. Batterbind S.C., from National Starch, is a cross-linked and oxidized dent corn starch. Purity 660, also from National Starch, is a cross-linked and hydroxypropyl substituted dent corn starch. Hylon V, also from National Starch, is an unmodified, high amylose corn starch. Pending 200, from Penwest Foods, is an oxidized potato starch. The oxidation increases its capacity to bind water and protein. Penbind 100, also from Penwest Foods, is a cross-linked potato starch.

Emulsifiers, Gelling Agents, Stabilizers and Thickeners. Gums, celluloses, and alginates are some examples of emulsifiers, gelling agents, stabilizers and thickeners. Many of the considerations that apply to starches also apply to gums and celluloses. Certain gums and celluloses, for example, should be hydrated and/or heated to realize their full functional characteristics. Heating and hydration also enables increased levels of the gums, celluloses, or alginates to be included in the final product. Some of the soft or firm/semi-hard cheeses that are provided herein contain at least about 0.01, 0.5 or 3.0 wt. % gum, cellulose, or alginate. The products thus generally have a gum, cellulose, or alginate concentration of about 0.01-3.0 wt. %. This means that the concentration of the gum, cellulose, or alginate in the slurry itself is typically about 0.02-6.0 wt. % or 0.05-5.0 wt. %.

Different types of celluloses can also be incorporated into the cheese. The cellulose can be either natural or modified. One cellulose or combinations of different celluloses can be utilized. Types of celluloses that can be utilized include, but are not limited to, microcrystalline cellulose, powdered cellulose, methylcellulose, propylene glycol alginate, and sodium alginate. One specific example of a commercially available modified cellulose is METHOCEL A-15 that is available from Dow Chemical Company (Midland, Mich.).

Examples of suitable gums that can be incorporated include, but are not limited to, xanthan gum, guar gum, konjac flour and locust bean gum. Examples of suitable stabilizers include chondrus extract (carrageenan), pectin, gelatin, and agar.

The total amount of gums and stabilizers included in the final cheese product is typically up to about 0.01, about 0.50, or about 3.0% by weight. More specifically, the amount of gums and/or stabilizers can range from about 0.01 to 3.0%, from about 0.25 to 2.5%, from about 0.5 to 2.0%, or about 0.75-1.5% by weight of the final cheese product. Gums and stabilizers concentrations in the slurry are typically in the range of about 0.02-6.0, or 0.50-5.0 wt. %.

Acidity Regulators, Anticaking Agents, and Firming Agents. Acidity regulators, anticaking agents, and firming agents of various types can be included in the cheese. Typically, these agents are inorganic salts, but other types of acidity regulators, anticaking agents, and firming agents can also be used. Examples of acidity regulators, anticaking agents, and firming agents may include calcium chloride, tricalcium phosphate, calcium hydroxide, powdered cellulose, disodium phosphate, and potassium hydroxide. These agents are typically added as part of a solution, (but could be used as a powder) either by incorporation in the slurry or in a non-heated liquid that is incorporated into the admixture of the slurry and heated cheese mass.

The total amount of acidity regulators, anticaking agents, and firming agents incorporated into a slurry is sufficient so the concentration of the acidity regulators, anticaking agents, and firming agents in the final cheese product is generally up to about 0.05, 1.2, or 3.0% by weight. More specifically, the amount of acidity regulators, anticaking agents, and firming agents can range from about 0.05 to 3.0%, from about 0.1 to 2.5%, or from about 0.5 to 2.0% by weight. This means that the concentration of the acidity regulators, anticaking agents, and firming agents in the slurry is typically about 2 to 95% by weight.

Sequestrants. A number of different sequestrants can be incorporated into the final cheese product. Sequestrants that can be utilized include, but are not limited to, various phosphate salts (e.g., sodium hexametaphosphate, monosodium phosphate, sodium tripolyphosphate, disodium phosphate, trisodium citrate and potassium phosphate), calcium citrate, calcium gluconate, oxystearin and sorbitol.

The total amount of sequestrant is usually up to about 0.1, 1, or 4% by weight of the final cheese product. So, for example, the amount of sequestrant in the final cheese product can range from about 0.1 to 4%, from about 0.25 to 3.0%, or from about 0.4 to 2.5% by weight. The concentration of the sequestrants in the slurry itself thus is generally about 0.1 to 95 wt. %.

Acids. An acid can be incorporated to adjust the pH of the finished cheese to a desired level. Various acids can be employed; examples of suitable acids include, but are not limited to, adipic acid, lactic acid, glucono-delta-lactone, phosphoric acid, lactobionic acid, hydrochloric acid, acetic acid, or Genlac C, the latter being a blend of water, citric acid, lactic acid, acetic acid and artificial flavors. Acid is typically added to adjust the pH of the finished cheese to a pH from about 5-6 is reached, and more typically from pH 5.10-5.70.

If included in the slurry, the acid agent is included in an amount sufficient to adjust the pH of the slurry within the range of about 0.0 to 8.0, for example, from about 0.5-6.5, or 1-5.

Cheese powders. Cheese powders can also be mixed into the cheese to impart a different cheese flavor to the finished product. Such powders are typically added to the heated cheese mass formed during the pasta filata process as a powder rather than as part of the slurry.

Examples of suitable cheese powders include, but are not limited to, Parmesan, cheddar, Monterey Jack, Romano, muenster, Swiss, and provolone powders. The amount of cheese powder in the finished cheese is generally about 0.25 to 10%, and in some instances about 1 to 5% by weight. Cheese powders are available from a variety of commercial suppliers, including, for example, Armour Foods of Springfield, Ky.

Colorants. A colorant can be incorporated into the cheese to adjust its natural color. This can be useful, for example, if consumers have a preference for a color other than the naturally-occurring color. Examples of suitable colorants include annatto, tumeric, titanium dioxide, and beta-carotene. Colorants may be of both the natural or artificial color. If one wished to color the cheese a red an artificial color such as FD&C red #40 can be used. Annatto is useful to give mozzarella cheese the appearance of cheddar. This allows one to produce a cheese for pizza baking that has the desired melt characteristics of mozzarella, but with a different appearance than that of traditional white mozzarella Annatto-colored mozzarella can be used as a replacement for cheddar cheese in many food products (e.g., Mexican-style prepared foods). Tumeric imparts a yellowish color to mozzarella, which naturally is white. The yellowish color often is preferred by consumers who perceive it to indicate a "richer" product upon cooking on a pizza. Colorants such as annatto and tumeric can be obtained, for example, from Chris Hansens Labs of Milwaukee, Wis.

Colorants can be incorporated into the final cheese product by inclusion in the slurry. If added apart from the slurry, the colorant is generally sprayed onto the heated cheese mass as an unheated solution or dispersion in water. The amount of colorant added is typically in the range of about 0.01 to 2%, based on the weight of the finished cheese. Tumeric, if used, is generally added in an amount of about 0.05 to 0.5%. If annatto is added, it normally is added to about 0.1 to 0.9% by weight.

Flavoring Agents. Various flavoring agents can also be incorporated into the cheese to tailor the flavor profile of the cheese to meet consumer preferences. Suitable flavors for mixing into the heated cheese include, for example, cheddar cheese flavor and parmesan cheese flavor.

Flavoring agents are typically added in an amount such that the concentration in the final cheese product is within the range of about 0.01 to 5 wt. %. If incorporated into the slurry, the concentration of the flavoring agent in the slurry is generally is in the range of about 0.02 to 5 wt. %.

Non-dairy protein isolate. A non-dairy protein isolate can also be incorporated into the soft or firm/semi-hard cheese. It is to alter the texture of the cheese and/or to change the size, color, or integrity of the blisters that are formed when the cheese is baked on a pizza, as well as other cook characteristics. Examples of suitable non-dairy protein isolates include, but are not limited to, soy protein (sometimes called "soy powder"), gelatin, wheat germ, corn germ, gluten, and egg solids.

The protein isolate is added such that the concentration of the protein isolate in the final cheese product is up to about 1, 15 or 30 wt. %. The concentration of the protein isolate in the slurry is thus adjusted so the concentration is about 2 to 95% by weight of the slurry.

Oils. Various oils can also be incorporated into the cheese. They are generally added to alter the fatty acid profile and/or cost of the cheese and/or to change the size, color, or integrity of the blisters that are formed when the cheese is baked, as well as other cook characteristics. Examples of suitable oils include, but are not limited to, vegetable oils, soy bean oil, corn oil, flax seed oil, walnut oil, palm oil, linoleic acid, fish oil, omega 3 fatty acids, and medium chain triglycerides, among others. Any of the oils may be partially or completely hydrogenated. If blended into the initial slurry, the oil is added in a concentration such that the concentration of the oil in the final cheese product is up to about 1.0, 20 or 35 wt. %. The concentration of the oil in the slurry is thus adjusted so the concentration is about 0 to 65, by weight, (e.g., about 5 to 50% wt.) of the slurry.

Salt. Salts of various types, but typically sodium chloride, can be added to tailor the flavor of the final cheese. The salt can be incorporated into the final cheese product by including it in the heated slurry or by adding it in granular form or as an unheated solution apart from the slurry. Regardless of how introduced, the salt concentration in the final cheese product is usually added at a level of about 0.1-5 wt. %. When added as an ingredient of the slurry, this means that the salt concentration in the slurry is generally about 0.0 to 25.0 wt. %, for example about 0.5-22%, or about 1-18% by wt.

Antifoaming Agents. Various antifoaming agents can be incorporated to facilitate processing. Examples include, but are not limited to, microcrystalline wax, oxystearin and polydimethylsiloxane.

Carbohydrates. A variety of simple sugars (e.g., mono- and disaccharides), as well as more complex carbohydrates can be included in the cheese. Examples include, but are not limited to, glucose, sucrose, and fructose.

Enzymes. Enzymes may be used to create flavors, texture, melt, and/or other functional characteristics in the final cheese product, and/or in the slurry that can then be transferred to the final cheese product once the slurry and cheese have been mixed together. Examples of such enzymes, and this is not an all inclusive list, would be lipases, proteases, oxidoreductases, and transglutaminase.

Neutraceuticals. Neutraceuticals may be included to deliver nutrients not normally present in cheese. Examples of neutraceuticals include, but are not limited to lycopene, antioxidants, probiotics, prebiotics, phosphatidylserine, vegetable sterols, immunoglobulins. These products in particular may be added as part of the slurry or to the mixer (mixer 290, FIG. 4B).

V. Slurries and Slurry Preparation Methods

Slurries that are combined with a cheese precursor to produce the soft or firm/semi-hard cheese product are also provided. As described, these compositions contain one or more of the ingredients or ingredients listed in the preceding section. In general, the concentration of these ingredients is sufficient to obtain a final soft or firm/semi-hard cheese product having the desired concentration of the ingredient (see preceding section). More specifically, the ingredient concentrations are in the range listed above.

The slurries utilized to prepare the soft or firm/semi-hard cheeses that are provided typically are water-based compositions. But some slurries alternatively or in addition include another liquids such as milk or cream. The water in some compositions typically accounts for from about 5-95% of the slurry by weight. Slurries may also include emulsions of water and oil and/or fat.

The slurries are optionally processed to be in a form that mixes well with another cheese ingredient (e.g., curd or heated cheese mass), that promotes dissolution of ingredients and/or that confers the desired processing or performance characteristics. Details regarding the slurry preparation process are described above, including FIGS. 3A and 3B and accompanying text.

One example of a useful base slurry is one that contains cream, nonfat dry milk and water. To obtain high concentrations on nonfat dry milk, it can be useful to include an acid and salt. Above about 60% nonfat dry milk, for example, the slurry can get very viscous and thus difficult to pump through the slurry processing system described above. By adding acid as a processing aid, and salt to the slurry, the viscosity can be reduced sufficiently such that the slurry containing the desired high levels of nonfat dry milk can be transported through the processing system. Although any acid and salt could be added elsewhere during the process, inclusion in the slurry can be useful for the reasons just listed.

To reiterate a point made earlier, slurries can be used to provide various benefits during the cheese manufacturing process, including increased yield. Nonfat dry milk contains about 27 wt. % casein protein and about 73% other components (e.g., ash, lactose, whey protein, etc.). If the nonfat dry milk is added to the milk at the beginning of the cheese manufacturing process, much of the casein becomes incorporated into the cheese, but much, or all, of the other components are lost. Using slurries and methods such as provided herein, essentially all of the casein and whey protein can be incorporated into the final cheese product, thus significantly increasing the yield of the overall process.

VI. Systems for Preparing Soft or Firm/semi-Hard Cheese Products

Figure 4A:
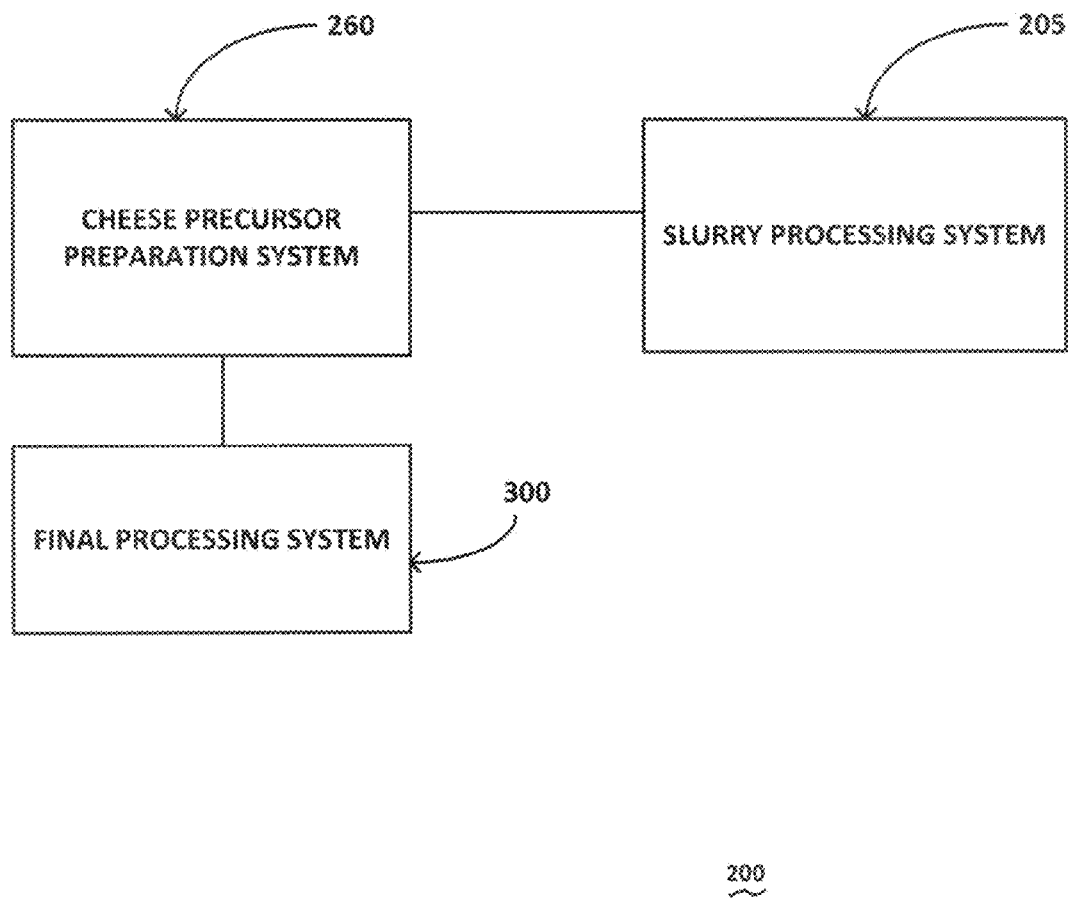
FIGS. 4A-4E depict various exemplary systems for preparing various types of cheese.

FIG. 4A depicts one example of a generalized system 200 that can be used to carry out the foregoing methods to prepare the soft or firm/semi-hard cheeses that are described herein. This exemplary system includes the following subsystems: (1) a slurry preparation system 205; (2) a cheese precursor preparation system 260 that is in fluid communication with slurry preparation system 205; and (3) a final processing system 300 that is in communication with cheese precursor preparation system 260. The slurry preparation system includes the equipment necessary to prepare the slurry that contains the one or more ingredients selected for inclusion in the final cheese product. The cheese precursor preparation system generally includes the equipment and devices required to prepare a cheese precursor, and can include a mixer or related device to combine the slurry with the precursor. The final processing system includes the equipment to convert the admixture of the slurry and cheese precursor into the desired final product.

A wide variety of different systems have this general design. Although specific examples of such systems are described below, it should be understood that these systems are only examples and not intended to be an exhaustive list of the types of systems that can be used to carry out the cheese processing methods that are described herein or of the type of systems that can be used to prepare the type of soft or firm/semi-hard cheeses that are disclosed herein.

Figure 4B:
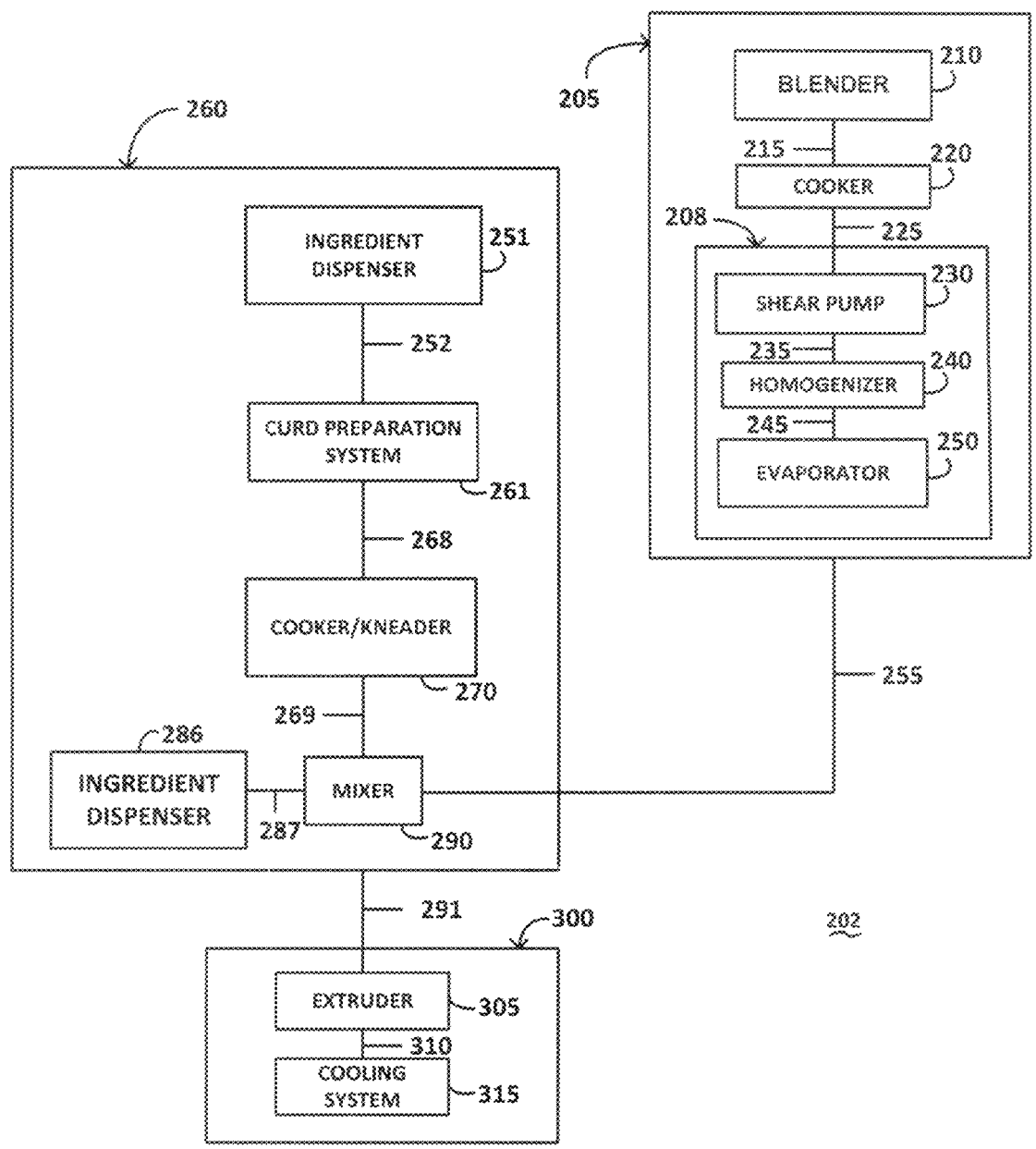
Figure 4C:
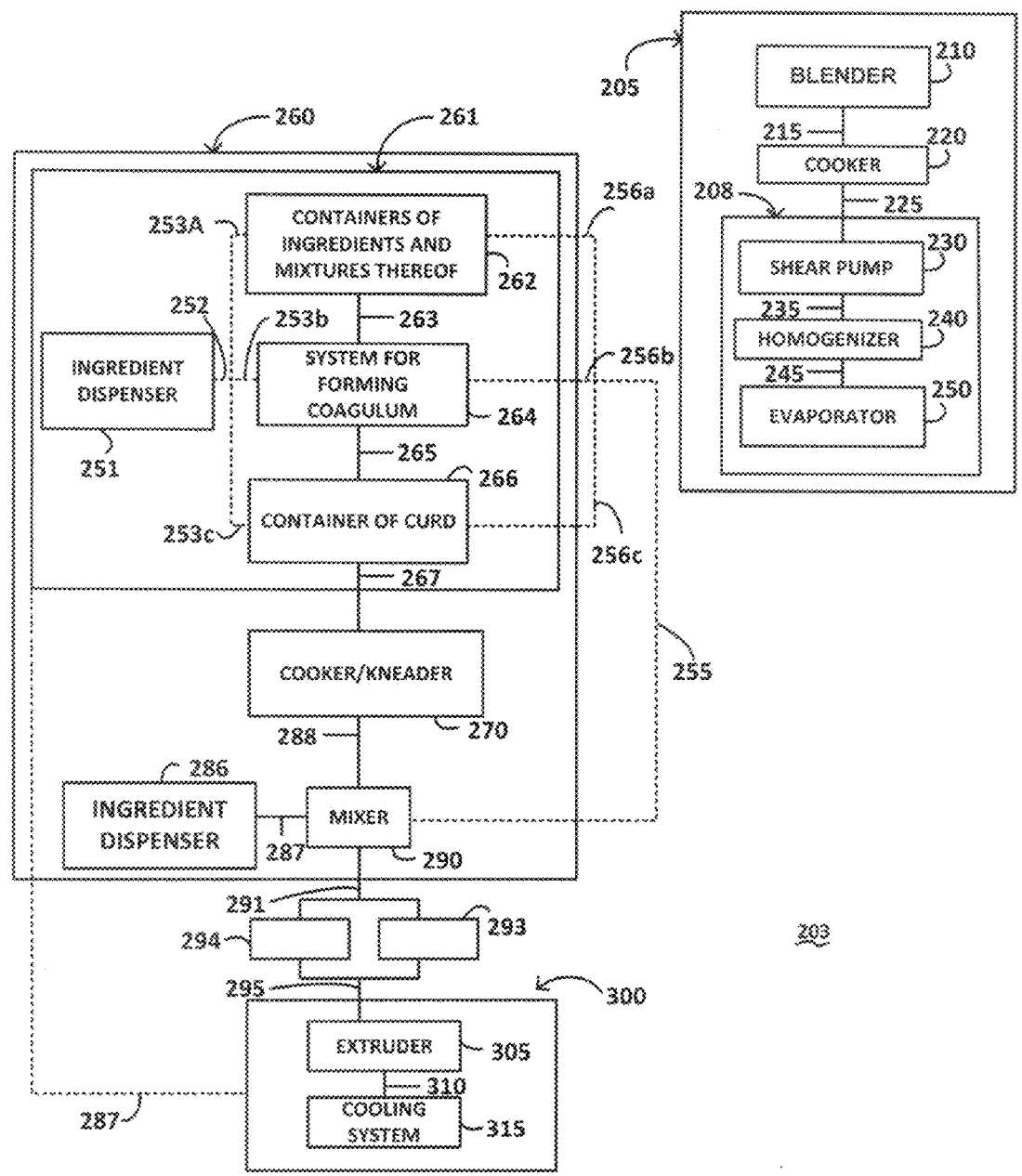

One exemplary system that can be used to perform the methods that are disclosed herein is shown in FIG. 4B. This particular system 202 is for use primarily in methods in which a slurry is combined with a heated mass of cheese (see, e.g., FIG. 3A). The cheese precursor preparation system 260 of system 200 generally includes a curd preparation subsystem 261 that is connected to cooker/kneader 270 by transfer tube 268. Cooker/kneader 270 is connected in turn by transfer tube 269 to mixer 290, which is also in communication with slurry preparation system 205 via transfer tube 255. In operation, curd is thus prepared in curd preparation subsystem 261 and can be transported through transfer tube 268 into cooker/kneader 270, where the cheese curd is heated and kneaded to form a heated cheese mass. This mass can then be combined with the slurry prepared in slurry preparation system 205. The cheese precursor preparation system 260 also includes dispenser 251 which is connected to curd preparation system 261. Thus, additional control over the composition and preparation of the final cheese product can be achieved by adding ingredients from dispenser 251 to compositions in the cheese curd preparation system 261 via transfer tube 252. But not all systems include such a dispenser.

The slurry preparation system 205 of system 200 generally includes the equipment necessary to blend, heat, shear, homogenize and adjust the water content of the slurry to obtain the desired slurry composition. More specifically, system 205 includes a blender 210 and cooker 220 that are connected to one another via transfer tube 215. The transfer tube 215 may include a pump stuffer that moves the slurry to the cooker 220. The pump stuffer may include two augers that move the slurry and a hopper that takes up the slurry into the augers from the blender 210. A liquid (e.g., water, milk and/or cream) and one or more slurry ingredients can thus be introduced into blender 210, where they are blended together to form an initial slurry. This resulting slurry can then be transported into cooker 220, where the slurry is heated to form a heated slurry. Slurry preparation system 205 in this system also includes slurry mixing and moisture control subsystem 208. The particular subsystem 208 shown in FIG. 4B includes shear pump 230, homogenizer 240 and evaporator 250. Subsystem 208 is in communication with cooker 220 and mixer 290.

In the particular subsystem shown in FIG. 4B it is shear pump 230 of subsystem 208 that establishes the link with cooker 220, as shear pump 230 is connected to cooker 220 via transfer tube 225. Shear pump 230 is also connected to homogenizer 240 by transfer tube 235, which in turn is connected to evaporator 250 by transfer tube 245. Subsystem 208 is connected to mixer 290 by transfer tube 255, which connects evaporator 250 and mixer 290.

Thus, heated slurry from cooker 220 can flow into shear pump 230 via transfer tube 225, where the slurry is subjected to shear conditions. The sheared slurry can subsequently be transferred to homogenizer 240 through transfer tube 235, where the slurry and the ingredient(s) it contains are homogenized. The resulting homogenized slurry can then flow through transfer tube 245 into evaporator 250. Evaporator 250 adjusts the moisture content so it is within the desired range. The final slurry then flows from evaporator 250 into mixer 290 via transfer tube 255.

The heated slurry from slurry preparation system 205 can then be combined with the heated cheese mass from cheese precursor preparation system 260 in mixer 290. Ingredients can also optionally be introduced into mixer 290 from additive dispenser 286, which is in communication with mixer 290 through transfer tube 287. The admixture formed in mixer 290 can then be transported via tube 291 and processed in final processing system 300. Final processing system 300 as depicted in this particular system includes extruder 305 that is connected to cooling system 315 by tube 310. Various other final processing systems, however, can also be utilized as described herein.

It will be appreciated by those of ordinary skill in the art that certain units within slurry preparation system 205 (e.g., cooker 220, shear pump 230, homogenizer 240 and evaporator 250) need not be included. Most slurry preparation systems include a blender to blend the liquid and ingredients together. But the slurry preparation system can include none of the other units just listed (i.e., cooker, shear pump, homogenizer and evaporator), individual units, combinations of multiple units or all the units depending upon the particular requirements of the application. It should also be understood that these units can be arranged in a variety of other configurations. For instance, although shown as separate units in FIG. 2C, shear pump 230 and homogenizer 240 can be part of a single unit in other systems. Other combinations that can optionally be utilized in still other systems are those in which cooker 220 and shear pump 230 are part of the same unit, and systems in which cooker 220, shear pump 230 and homogenizer 240 are all part of the same integrated unit.

The order in which cooker 220, shear pump 230 and homogenizer 240 appear in FIG. 4B can also be altered in other systems such that all the various permutations are possible. Examples of optional arrangements that can be utilized in other systems include: 1) cooker-homogenizer-shear pump, 2) shear pump-homogenizer-cooker, 3) shear pump-cooker-homogenizer, 4) homogenizer-shear pump-cooker, 5) homogenizer-cooker-shear pump, and the other various permutations.

Another exemplary system is illustrated in FIG. 4C. This figure depicts a system 203 that would typically be used to conduct methods in which the slurry is mixed with a cheese curd or curd precursor (see, e.g., FIG. 3B). The resulting admixture can then be heated and kneaded as in a pasta filata type process.

The slurry preparation system 205 for system 203 is as described for system 202. The cheese precursor preparation system 260 includes various units utilized in the preparation of cheese curd. Cheese precursor preparation system 260 in the particular system shown in FIG. 4C thus includes, for instance, curd preparation system 261, which includes curd containers 262 of cheese ingredients (e.g., milk, starter and cream) or mixtures thereof (e.g., cheese vat), a system for forming coagulum 264, and containers 266 of curd. Cheese precursor preparation system 260 also includes mixer 290, but some systems omit this mixer. In operation, ingredients or mixtures thereof in containers 262 can be moved to the system for making the coagulum 264 via transfer tube 263. The coagulum can subsequently be transported from system 264 to container 266 through tube 265. The curd can then be moved from containers 266 to mixer 290 through transfer tube 267. Curd preparation system 261 may also include ingredient dispenser 251, which can be connected to ingredient containers 262, coagulation system 264 and/or curd container 266 via transfer lines 253*a*, 253*b*, 253*c*, respectively. This thus allows the option of adding ingredients at each of these stages of the process.

In system 203, slurry can be transported through lines 255 and lines 256*a*, 256*b*, and/or 256*c* such that the slurry becomes combined with the ingredients or mixtures in containers 262, the coagulum in coagulation system 264, and/or the curd in containers 266. System 203 is designed to allow for various processing options once the slurry and cheese precursor are combined to allow for a curd/slurry admixture. One option, for example, is to transport the admixture through tube 291 to the final processing system 300 to form the final product. In an alternative configuration, however, curd preparation system 261 is in communication with cooker 270 via tube 267, which in turn is connected to mixer 290 via tube 267. Mixer 290 may be connected to final processing system 300 by transfer tube 291. Alternatively, the transfer tube 291 may divert the flow of the admixture between coloring units 293 and 294. Coloring unit 293 may add coloring (e.g., orange coloring) to the admixture to give it the appearance of, for example, cheddar cheese, while coloring unit 294 may add no color and leave the cheese substantially white in color. The entire admixture may be diverted through one or the other coloring units 293 and 294, as well as being adjustable to split the admixture between the coloring units to create, for example, a cheese combination from the admixture.

Another option is for the admixture to be moved to cooker 270 through tube 267. Once the admixture has been heated and kneaded, the resulting heated admixture can be transported to mixer 290 via tube 288. This thus allows additional ingredients to be introduced into the admixture from dispenser 286 as described with respect to system 202. Once the additional ingredients are mixed in with the slurry and cheese precursor admixture, the resulting admixture can be transported to final processing system 300 through tube 291.

Figure 4D:
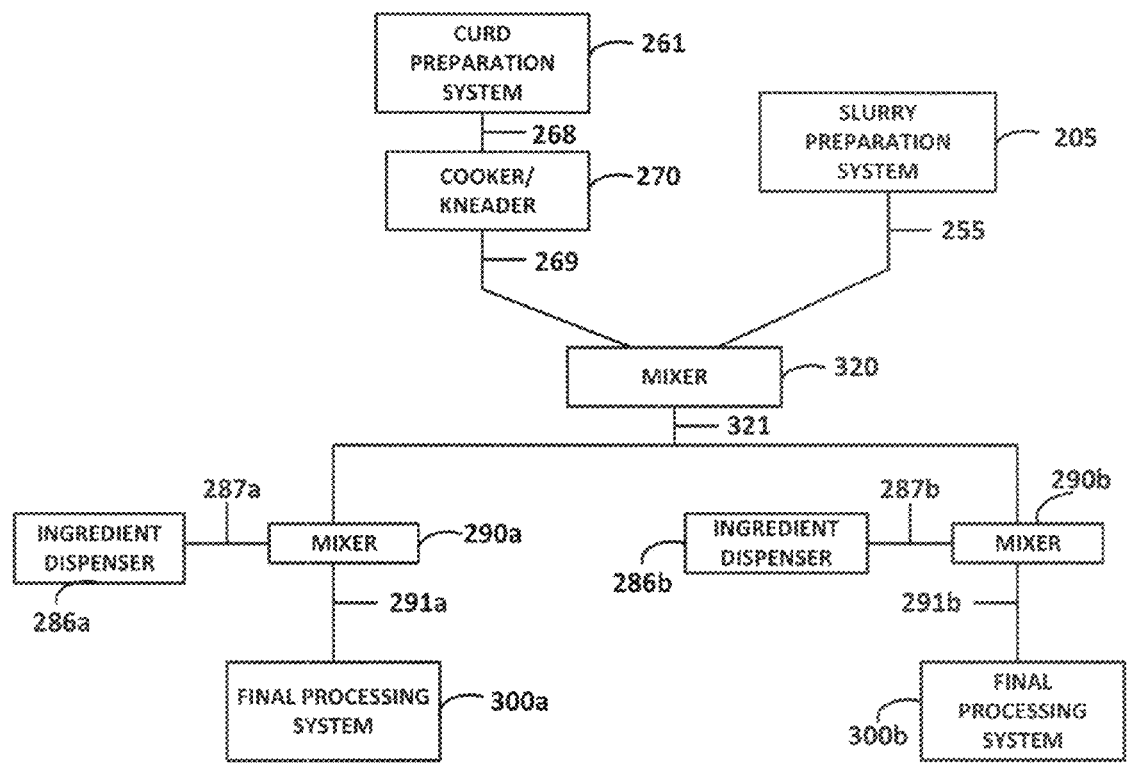
Figure 4E:
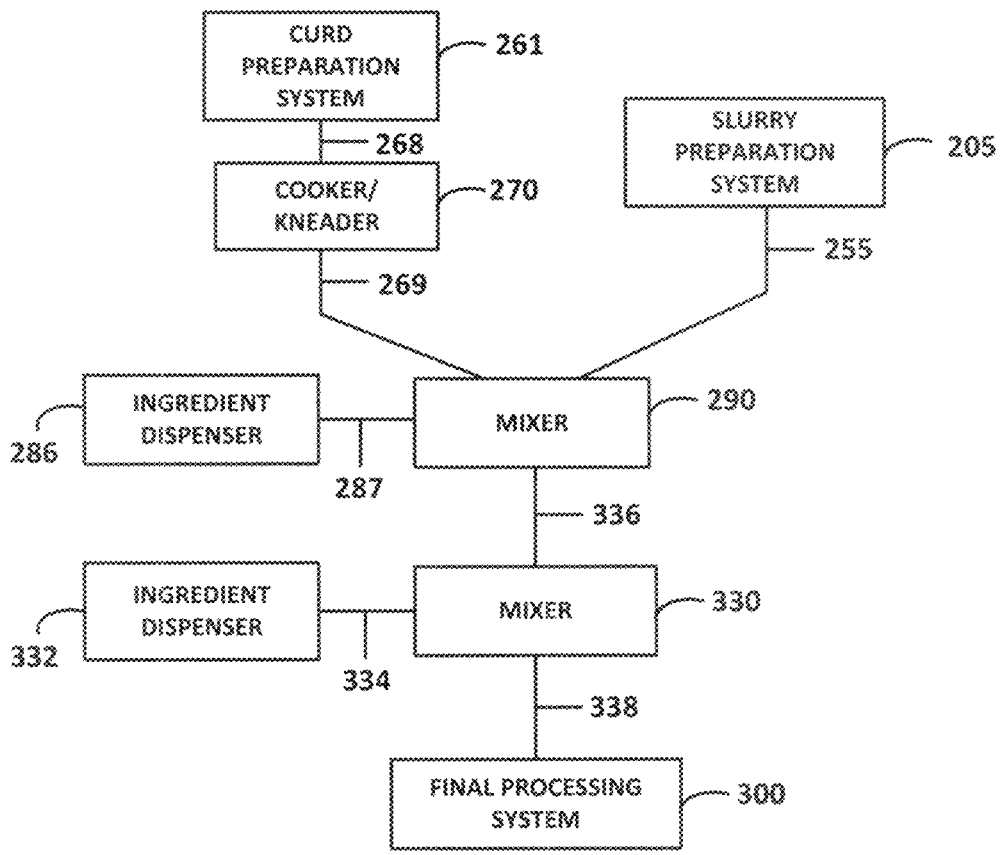

Embodiments of the system also include the introduction of ingredients in parallel and serial fashion. Referring to FIG. 4D, for example, a system 400 is shown with a configuration that has transfer tube 321 diverting the admixture from mixer 320 into two mixers 290*a* and 290*b*. Transfer tubes 287*a* and 287*b* connect the mixers 290*a* and 290*b* to ingredient dispensers 286*a* and 286*b*, respectively, which can add the same or different ingredients to admixtures. The final admixtures may then be sent through transfer tubes 291*a* and 291*b* to final processing systems 300*a* and 300*b*, respectively. In another example, FIG. 4E shows system 410 that has one or more ingredients added sequentially from ingredient dispensers 286 and 332. In system 410, a first ingredient (or first plurality of ingredients) is dispensed to mixer 290 from ingredient dispenser 286 via transfer tube 287. The resulting admixture may be sent through transfer tube 336 to mixer 330, where one or more additional ingredients may be added by a second ingredient dispenser 332 coupled to the mixer 330 via transfer tube 334. The additional ingredients may be the same as, or different than the first ingredient (or first plurality of ingredients). The resulting admixture formed in mixer 330 may be sent through transfer tube 338 to the final processing system 300.

The final processing system utilized in these exemplary systems can vary, but can include a pre-brine tank that includes super cold sodium chloride brine into which molten cheese or cheese ribbons can flow. A cutter can cut the cheese into loaves as the cheese ribbon exits the pre-brine tank. The cooled and salted loaves are then transferred to a main brine tank where they stay until removed by a conveyor. An exemplary system of this general design is described in U.S. Pat. No. 5,902,625, which is incorporated herein by reference in its entirety for all purposes.

A variety of different types of equipment can be utilized in the foregoing systems. For example, different types of blenders can be used to mix the ingredients together to form the initial slurry. In general, the blender simply needs to be capable of mixing relatively viscous fluids. One common blender is a twin-screw mixer or extruder such as is common in the food industry. Ribbon blenders or pipelines that include a series of pumps and static mixers can also be utilized.

The cooker used in the slurry preparation systems can be of various types, including the lay-down cooker, swept surface heat exchanger, agitated direct heating pipeline cooker. The cookers are capable of heating a slurry of the compositions defined herein to temperatures ranging from about 90-293° F. Specific examples of suitable cookers include the RotaTherm™ cooker available from Gold Peg International Pty. Ltd. (Moorabbin, Vic, Australia) or the FusionCooker™, available from Blentech Corporation, Rohnert Part, Calif.), the continuous mixer from READCO Manufacturing (York, Pa.), or single or Evolum 145 twin screw extruders from Clextral Inc. (Tampa Fla.). The cookers can heat the slurry by convection (e.g., a heated blanket surrounds the cooker), conduction, or radiation, or by directly injecting steam into the cooker.

Various types of shear pumps can be utilized. Suitable types of shear pumps include inline mixers, or colloid mills. Examples of pumps that can be used include Silverson in-line mixer (East Longmeadow, Mass.) and Stephan cooker (Stephan Machinery Corporation (Columbus, Ohio), or a colloid mill supplied by Waukesha Cherry Burrell (Charlotte, N.C.). The shear pump should be capable of generating a shear rate of at least 10,000 to 500,000 $s^{-1}$.

A number of homogenizers are also suitable for use in the systems that are provided. Examples of homogenizers that can be used include those manufactured by APV Gaulin (Kansas City, Mo.) and Waukesha Cherry Burrell (Charlotte, N.C.). Evaporators of different types can also be utilized. In general, the evaporator should be able to handle relatively viscous solution. Flash vacuum vessels are one example of a suitable evaporator. Evaporators of this type are available from Invensys APV (Lake Mills, Wis.) or De Dietrich Process Systems (Bridgeton, Mo.). Some systems include a feedback system that is connected to the evaporator (e.g., a near infrared monitor). This system may include a sensor that can monitor the moisture level in the slurry coming from the evaporator and send a signal to the evaporator signaling the evaporator to increase, decrease or maintain the level at which water is removed from the slurry so the desired moisture content in the slurry is achieved.

For systems in which the cheese curd is heated and kneaded, a number of different kneading mixers can be used to form the heated mass of cheese. One exemplary device for performing this operation is a single or twin-screw mixer or a twin-screw extruder, either fitted for steam injection or having a heated jacket, or a combination of both. When using a twin-screw mixer or extruder to perform the heating and kneading, the screws (i.e., augers) are typically arranged so they overlap, to insure thorough mixing.

VII. Soft or Firm/semi-Hard Cheeses

The methods that are described herein can be utilized to prepare soft or firm/semi-hard cheeses that contain one or more of the ingredients at the concentration ranges described herein. As indicated above, some of the methods that are disclosed herein can be utilized to manufacture soft or firm/semi-hard cheeses that contain ingredients that become functionalized when included in a slurry and are subject to heating and/or hydration. Some of the soft or firm/semi-hard cheeses can also include relatively high concentrations of certain ingredients. As set forth above, some of the soft or firm/semi-hard cheeses can contain at least 10, 11, 12, 13 or 14 wt. % of one or more of the ingredients listed above. So, for instance, some of the cheeses that are provided have one, two, three or more of the following characteristics.

Some of the soft- or semi soft cheeses that are provided are characterized by having a starch concentration of at least 10, 11, 12, 13 or 14 wt. %. So, for example, some of the soft or firm/semi-hard cheeses have a starch concentration of about 12-14 wt. %, others a starch concentration of about 14-16 wt. %, and still others a starch concentration of about 16-20 wt. %.

A characteristic of other soft or firm/semi-hard cheeses that are provided is that they have a dairy solid (e.g., nonfat dry milk) concentration of at least 10, 11, 12, 13 or 14 wt. %. Other soft or firm/semi-hard cheeses have dairy solid concentrations up to about 16, 17, 18, 19, or 20 wt. %. Some soft or firm/semi-hard cheeses of this type thus have dairy solid concentrations of about 12-14 wt %. Other soft or firm/semi-hard cheeses have a dairy solid concentration of about 14-16 wt. %, or about 16-20 wt. %.

Other soft or firm/semi-hard cheeses that are provided have a cellulose concentration of at least 0.01, 0.5, or 3.0 wt. %. Such cheeses, for instance, thus have cellulose concentrations that range from about 0.01-3.0, or 0.25-2.5, or 0.5-2.0 wt. %.

The soft or firm/semi-hard cheeses that are provided typically have a protein content of about 10-40 wt. %, a moisture content of about 35-65%, and a fat content of about 0-60% on a dry basis (FDB). The actual composition varies somewhat depending upon the particular type of cheese that is to be produced. For certain soft or firm/semi-hard cheeses (e.g., mozzarella cheeses) that are provided, the milk fat content is at least 45% by weight of solids and the moisture content is about 52-60 wt. %. The low-moisture soft or firm/semi-hard cheeses (also sometimes referred to as low-moisture mozzarella cheeses) that are provided generally have a minimum milk fat content of 45% by weight of solids and a moisture content that is about 45-52 wt. %. Part skim-milk soft or firm/semi-hard ripened and unripened cheeses (also called part skim mozzarella cheeses) that are provided, in contrast, have a milk fat content that ranges from about 30-45% by weight of solids and a moisture content that is about 52-60 wt %. The low-moisture, part-skim soft or firm/semi-hard ripened and unripened cheeses (also referred to as low-moisture, part skim mozzarella cheeses) that are provided usually have a milk fat content of about 30-45% by weight of the solids and a moisture content of about 45-52 wt %. The foregoing moisture percentages are for bound plus free water, i.e., the percent of weight lost when the cheese is dried for 17 hrs±1 hr in a 100° C. oven.

The soft or firm/semi-hard cheeses that are provided can be in a variety of different forms including loaves, Ribbons™, comminuted forms (e.g., diced or shredded forms) and other forms known in the art. The pH of the soft or firm/semi-hard cheese generally ranges from about 5.00 to about 6.00, such as about 5.10 to about 5.90.

VIII. Food Products and Methods of Manufacturing Such Food Stuffs

The soft or firm/semi-hard cheeses that are provided can be utilized in essentially any baking application that involves the use of soft or firm/semi-hard cheese and can be incorporated into a wide variety of foodstuffs and food products. The soft or firm/semi-hard cheeses, for instance, can be included as an ingredient in a variety of convenience foods, including entrees, snack foods and appetizers.

The term "food product" is intended to broadly encompass any type of food to which one can add cheese. Examples of suitable types of foods into which the provided cheeses can be added, include, but are not limited to: cereal-based products; poultry, beef, pork or seafood-based entrees; potatoes; vegetables; fruit; candy; and nuts. The cereal-based products can be of diverse types including, for instance, pizzas, burritos, dough-enrobed sandwiches, hand-held foods, breads, bagels, pastries, and grain-based snack foods (e.g., crackers and pretzels). The cheese can be included with a variety of different forms of potatoes, including, chips, French fries, hash browns, and strings. Likewise, vegetables of various types can be combined with the cheeses that are provided. Exemplary vegetables include, mushrooms, zucchini, peppers (e.g., jalapenos) and cauliflower.

The soft or firm/semi-hard cheeses can be incorporated into the food product, layered onto or in the food product or used as a coating. One common use, for example, is as an exposed cheese on a pizza or as the string cheese rolled in the outer lip of a pizza crust (a so-called "stuffed crust pizza").

As those skilled in the art will recognize, the foregoing list is simply illustrative and is not intended to be an exhaustive list of the types of foods that can be combined with the cheeses that are provided herein.

The soft or firm/semi-hard cheeses that are provided are suitable for use in essentially any type of cooking including convection heating, steam injection heating and microwave heating, for example. In some microwave heating applications, for example, the food product is exposed to microwave energy in an amount and for a duration sufficient to heat and melt the cheese, whereby the cheese melts to form a uniform mass of cheese. The cheeses can generally be heated in a variety of microwaves, such as microwaves having wattages of 400-1000 watts, or full power microwave ovens of 650-850 watts that are common home microwave ovens. The cheeses can be cooked over a range of cooking times such as from 0.5 to 20 minutes, or 0.5-10 minutes, or 2-5 minutes, which are the typical microwave cook times used to prepare frozen or refrigerated entrees and appetizers.

The soft or firm/semi-hard cheeses that are disclosed herein can be combined with food products such as those just listed using any of a variety of methods. For example, the food product can be dipped in melted cheese. Alternatively, the cheese can be sprinkled or layered onto the food product using conventional food processing equipment. In such processes, the cheese is typically first comminuted to form relatively small pieces of cheese or shredded cheese.

Once the cheese has been combined with the food product, the resulting food product can optionally be refrigerated or frozen for future sale or use.

The following examples are presented to illustrate certain aspects of the methods and soft or firm/semi-hard cheeses that are disclosed herein. These examples should not be construed to limit the scope of the claims.

EXAMPLES

Three different levels of nonfat dry milk (NDM) (2.5%, 6.0%, and 12.0%, by weight) were incorporated into Mozzarella cheese, either directly in powder form (see Examples a, c, and e) or as part of a slurry added to the cheese curds (see Examples b, d, and f). The slurry compositions included the NDM, as well as salt, cream, water, and gluconic acid, where the gluconic acid is added to the slurry as a processing aid to cause a reduction in slurry viscosity before cooking, making the slurry easier to pump through the cooker and other system equipment. The relative amounts of the slurry ingredients used in the slurry examples (i.e., Examples b, d, and f) are summarized in Table 1:

TABLE 1

| Slurry Composition | | | | | |
|---|---|---|---|---|---|
| Treatment | % NFDM | % SALT | % CREAM | % WATER | % GLUCONIC ACID (50% TS) |
| Example b. 2.5% NDM added as slurry | 54.19 | 5.8 | 29.63 | 10.38 | 0 |
| Example d. 6.0% NDM added as slurry | 54.19 | 5.8 | 29.63 | 7.05 | 3.33 |
| Example f. 12.0% NDM added as slurry | 54.19 | 5.8 | 21.05 | 13.96 | 5.00 |

The final cheese product included conventional starter cultures and the composition targets were 49.0% moisture, 40.0 FDB, 5.35 pH, and 1.80% salt. Ribbon™ cheese (7×9×2-inches) was extruded and the packaged cheese samples were stored at 35° F. (1.7° C.) for 14 days before being shredded on an Urchell CC shredder (Urchell Laboratories, Inc., Indiana, USA) into cuts with approximate dimensions of 1.25"-3" by 0.20" by 0.095". The cuts were individually frozen and stored at −20° F. Two-pound samples of cheese were removed, thawed at 35° F. (1.7° C.) and melted on two different types of pizza, including a conveyor-bake pizza (Middleby Marshall oven at 420° F. (215.6° C.) for 6.5 minutes) composed of 7-oz of cheese on a regular pizza crust with 4-oz of pizza sauce. The cheese was also melted on a frozen pizza composed of 5.6-oz of frozen cheese placed on a ready-made crust with 3-oz of sauce and frozen for 24 hrs prior to melting in a home oven at 425° F. for 19 minutes.

The shred cut qualities and melt grades of the cheeses produced in Examples a-f were then measured. The melt grade measurements of the cheeses on the service oven pizzas and cooked frozen pizzas included comparisons of the blister color, blister %, blister size, melt, stretch, and oiling-off. The melt grade measurements were made with a 20-point scale, with 10 being the best grade, while 1 is too little, and 20 is too much. Table 2 summarizes the melt grade grading system:

TABLE 2

Melt Grade Grading System

|  | NONE | SLIGHT | MODERATE | DEFINITE | PRONOUNCED |
|---|---|---|---|---|---|
| Score | 1 to 4 | 5 to 8 | 8 to 12 | 12 to 16 | 16 to 20 |
| Blister % | 0-10% | 10-25% | 25-50% | 50-75% | >75% |
| Blister Size | ⅛ to ¼' | ⅜ to ½' | ⅝ to ¾' | ⅞ to 1' | >1' |
| Blister Color | Light Golden | Golden to Light Golden | Brown | Dark Brown | Black |
| Oiling Off | None | Even sheen over cheese surface | Some minor areas with slight pooling | Noticeable collection areas | Entire surface heavily coated with oil |
| Meltdown | Cheese does not fuse together after cooking | Appears fused together but shows minor jigsaw appearance | Cheese completely fused together | Cheese is slightly soupy and sauce appears to bleed through | Cheese is very runny, soupy and appears weak in body |
| Stretch | 0 to 1' | 1½ to 3' | 3 to 5' | 5 to 7' | >7' |

The shred quality measurements of the cheeses included comparisons of shred quality and shred compaction. These measurements were made on a 4-point scale with 1 being the best, and 4 being the least acceptable. Table 3 summarizes the results of the melt grade and shred quality measurements for Examples A-F.

TABLE 3

Shred Quality and Melt Grades for Examples a-f

| | Food Service Pizza | | | | | | Frozen Pizza | | | Shred Cut Quality | |
|---|---|---|---|---|---|---|---|---|---|---|---|
| | Blister % | Blister Size | Blister Color | Oiling Off | Melt | Stretch | Blistering | Melt | Stretch | Shred Compaction | Shred Quality |
| Example a. 2.5% NDM added as powder | 5 | 2 | 10 | 3 | 9 | 11 | 2 | 8 | 9 | 1.0 | 1.0 |
| Example b. 2.5% NDM added as slurry | 6 | 2 | 10 | 3 | 10 | 13 | 3 | 8 | 11 | 1.0 | 1.5 |
| Example c. 6.0% NDM added as powder | 3 | 1 | 14 | 4 | 10 | 12 | 1 | 7 | 8 | 1.5 | 2.0 |
| Example d. 6.0% NDM added as slurry | 6 | 2 | 12 | 3 | 9 | 10 | 1 | 7 | 8 | 1.5 | 2.0 |
| Example e. 12.0% NDM added as powder | 4 | 2 | 15 | 3 | 12 | 8 | 3 | 12 | 6 | 2.0 | 2.5 |
| Example f. 12.0% NDM added as slurry | 3 | 1 | 16 | 3 | 13 | 9 | 1 | 9 | 5 | 2.0 | 3.0 |

Figure 5A:
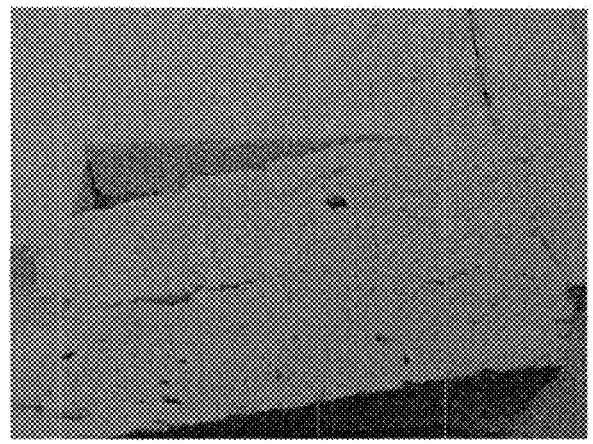
FIGS. 5A-B show cross sectional samples of finished cheeses.
Figure 5B:
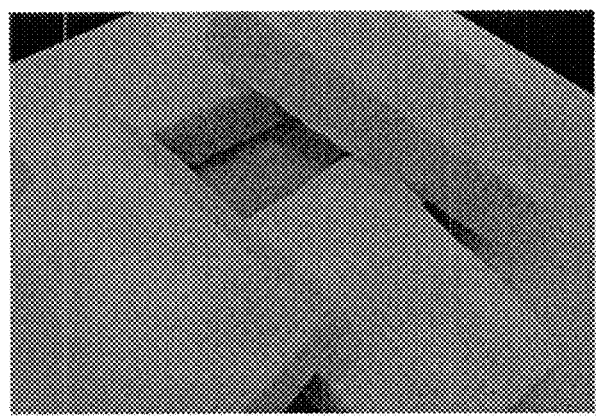

FIGS. 5A-B show the difference in the quality of the final cheese products when the NDM is added directly as a powder to the cheese curd versus adding the NDM as a component of a liquid slurry. Adding the dry powder NDM at both the 6% and 12% levels causes powdered lumps in the finished cheese as shown in FIG. 5A. The lumps give the cheese an inferior taste and feel, and can also damage dicer blades that are used to shred the cheese. In contrast, a slurry that is added to cheese having NDM at the same levels (i.e., 6% and 12% by wt. NDM in the finished cheese) results in a smooth, homogenous finished cheese as shown in FIG. 5B.

* * *

It is understood that the examples and embodiments described herein are for illustrative purposes only and that various modifications or changes in light thereof will be suggested to persons skilled in the art and are to be included within the spirit and purview of this application and scope of the appended claims. The cheeses of the present invention may be made by the methods described herein, or by any other method that produces a finished cheese product having the same physical or chemical properties as the present cheeses. All publications, patents and patent applications cited herein are hereby incorporated by reference in their entirety for all purposes to the same extent as if each individual publication, patent or patent application were specifically and individually indicated to be so incorporated by reference.

What is claimed is:

1. A pasta filata cheese product that has a lactose concentration of 0.5 to 25 wt. %, a non-fat dry milk concentration of at least 6 wt. %, and one or more additional ingredients chosen from a milk protein, an acidity regulator, an acid, an anticaking agent, an antifoaming agent, a coloring agent, an emulsifier, an enzyme preparation, a flavoring agent, a firming agent, a food protein, a gelling agent, a preservative a stabilizer, a thickener, an oil, a fat, a cheese powder, a salt, a nutritional supplement, an acid, an enzyme, a neutraceutical, a carbohydrate, a vitamin, and a mineral,
   wherein the non-fat dry milk is incorporated into the pasta filata cheese through a slurry comprising the non-fat dry milk, and wherein the slurry has been subjected to at least one of:

(i) exposing the slurry to high shear conditions;
(ii) homogenizing the slurry;
(iii) heating the slurry; and
(iv) adjusting the water content of the slurry, and
wherein the pasta filata cheese product does not have any powdered lumps of the non-fat dry milk, and wherein the cheese product has a moisture content of about 45 to 60 wt. %.

2. The cheese product of claim 1, wherein the cheese product comprises two or more of the additional ingredients.

3. The cheese product of claim 1, wherein the pasta filata cheese comprises mozzarella cheese.

4. The cheese product of claim 1, wherein the lactose and the additional ingredients have a combined concentration of at least 1 wt. % of the cheese product.

5. The cheese product of claim 1, wherein the native or modified starch is chosen from potato starch, pea starch, tapioca, corn starch, wheat starch, and rice starch.

6. The cheese product of claim 5, wherein the corn starch is further chosen from dent corn starch, waxy corn starch, and high-amylose corn starch.

7. The cheese product of claim 1, wherein the non-fat dry milk concentration in the pasta filata cheese product is at least 12 wt. %.

8. The cheese product of claim 1, wherein the cheese has one or more of the following characteristics:
a starch concentration of about 0.5 to about 20 wt. %; or
(ii) a gum or cellulose concentration of about 0.5 to about 20 wt. %,
wherein the cheese product comprises a block cheese, a ribbon cheese, a string cheese, a comminuted cheese, a diced cheese, or a shredded cheese.

9. The cheese product of claim 1, wherein the lactose has a concentration of about 4 to 16 wt. %.

10. A pasta filata cheese product that has at least one ingredient chosen from:
(i) a native or modified starch;
(ii) lactobionic acid or a salt thereof; and
(iii) a gum or cellulose,
wherein the pasta filata cheese product further includes a non-fat dry milk concentration of at least 6 wt. %,
wherein the non-fat dry milk is incorporated into the pasta filata cheese through a slurry comprising the non-fat dry milk, and wherein the slurry has been subjected to at least one of:
(i) exposing the slurry to high shear conditions;
(ii) homogenizing the slurry;
(iii) heating the slurry; and
(iv) adjusting the water content of the slurry,
wherein the pasta filata cheese product does not have any powdered lumps of the non-fat dry milk, and
wherein the pasta filata cheese product also includes one or more additional ingredients chosen from a milk protein, an acidity regulator, an acid, an anticaking agent, an antifoaming agent, a coloring agent, an emulsifier, an enzyme preparation, a flavoring agent, a firming agent, a food protein, a gelling agent, a preservative, a stabilizer, a thickener, an oil, a fat, a cheese powder, a salt, a nutritional supplement, an acid, an enzyme, a neutraceutical, a carbohydrate, a vitamin, and a mineral,
and wherein the at least one ingredient (i)-(iii) and the additional ingredients have a combined concentration of greater than 10%, by weight of the pasta filata cheese product.

11. The cheese product of claim 10, wherein the cheese product includes at least two of the ingredients (i)-(iii).

12. The cheese product of claim 10, wherein the cheese product includes all three of the ingredients (i)-(iii).

13. The cheese product of claim 10, wherein the native or modified starch is chosen from potato starch, pea starch, tapioca, corn starch, wheat starch, and rice starch.

14. The cheese product of claim 10, wherein the gum or cellulose is chosen from microcrystalline cellulose, powdered cellulose, methylcellulose, propylene glycol alginate, sodium alginate, xanthan gum, guar gum, konjac flour, and locust bean gum.

15. The cheese product of claim 10, wherein the stabilizer is chosen from carrageenan, pectin, gelatin, and agar.

16. The cheese product of claim 10, wherein the pasta filata cheese product is mozzarella cheese.

17. The cheese product of claim 10, wherein the cheese product is chosen from a block cheese, a ribbon cheese, a string cheese, a comminuted cheese, a diced cheese, and a shredded cheese.

18. A pasta filata cheese that has at least one ingredient chosen from:
(i) a native or modified starch;
(ii) lactose; and
(iii) a gum or cellulose,
wherein the pasta filata cheese product further includes a non-fat dry milk concentration of at least 6 wt. %,
wherein the non-fat dry milk is incorporated into the pasta filata cheese through a slurry comprising the non-fat dry milk, and wherein the slurry has been subjected to at least one of:
(i) exposing the slurry to high shear conditions;
(ii) homogenizing the slurry;
(iii) heating the slurry; and
(iv) adjusting the water content of the slurry,
wherein the pasta filata cheese product does not have any powdered lumps of the non-fat dry milk,
and wherein the at least one ingredient (i)-(iii) have a combined concentration of at least 1%, by weight of the pasta filata cheese product, and wherein at least one of the ingredients (i)-(iii) is added to the cheese product from an aqueous slurry.

19. The pasta filata cheese of claim 18, wherein the pasta filata cheese further comprises a dairy solid chosen from whey protein concentrate, casein hydrolyzate, milk fat, lactalbumin, cream, milk protein concentrate, milk protein isolate, lactose, casein, whey protein isolate, hydrolyzed whey protein, denatured whey protein, skim cheese powder, natural casein isolate, delactose permeate, procream, and minerals derived from milk.

20. The pasta filata cheese of claim 18, wherein the native or modified starch is chosen from potato starch, pea starch, tapioca, corn starch, wheat starch, and rice starch.

21. The pasta filata cheese of claim 18, wherein the gum or cellulose is chosen from microcrystalline cellulose, powdered cellulose, methylcellulose, propylene glycol alginate, sodium alginate, xanthan gum, guar gum, konjac flour, and locust bean gum.

22. The pasta filata cheese of claim 18, wherein the pasta filata cheese includes an acid chosen from adipic acid, lactic acid, glucono-delta-lactone, phosphoric acid, lactobionic acid, hydrochloric acid, acetic acid, and genlac C.

23. The pasta filata cheese of claim 18, wherein the pasta filata cheese includes a non-dairy protein isolate chosen from soy protein, gelatin, wheat germ, corn germ, gluten, and egg solids.

24. The pasta filata cheese of claim 18, wherein the pasta filata cheese includes a neutraceutical chosen from lycopene, an antioxidant, a probiotic, a prebiotic, phosphatidylserine, a vegetable sterol, and an immunoglobulin.

25. The pasta filata cheese of claim 18, wherein the pasta filata cheese comprises a block cheese, a ribbon cheese, a string cheese, a comminuted cheese, a diced cheese, or a shredded cheese.

26. The pasta filata cheese of claim 18, wherein the pasta filata cheese has a moisture content of about 45 to 60 wt. %.

27. The cheese product of claim 10, wherein the cheese product includes lactose having a concentration of 0.5 to 25 wt. %.

28. The pasta filata cheese of claim 18, wherein the lactose has a concentration of 0.5 to 25 wt. %.

29. The pasta filata cheese of claim 18, wherein the pasta filata cheese includes lactobionic acid or a salt thereof.

* * * * *